(12) United States Patent
McDonald

(10) Patent No.: US 10,765,495 B2
(45) Date of Patent: Sep. 8, 2020

(54) DENTAL IMPLANT

(71) Applicant: Azenium IP Limited, Katikati (NZ)

(72) Inventor: Simon P. McDonald, Katikati (NZ)

(73) Assignee: Azenium IP Limited, Katikati (NZ)

( * ) Notice: Subject to any disclaimer, the term of this patent is extended or adjusted under 35 U.S.C. 154(b) by 42 days.

(21) Appl. No.: 15/519,479

(22) PCT Filed: Oct. 9, 2015

(86) PCT No.: PCT/US2015/055012
§ 371 (c)(1),
(2) Date: Apr. 14, 2017

(87) PCT Pub. No.: WO2016/060962
PCT Pub. Date: Apr. 21, 2016

(65) Prior Publication Data
US 2017/0239020 A1    Aug. 24, 2017

(30) Foreign Application Priority Data

| Oct. 17, 2014 | (NZ) | ................. | 701110 |
| Apr. 8, 2015 | (NZ) | ................. | 706774 |
| May 4, 2015 | (NZ) | ................. | 707717 |

(51) Int. Cl.
*A61C 8/00* (2006.01)

(52) U.S. Cl.
CPC .......... *A61C 8/0033* (2013.01); *A61C 8/0036* (2013.01); *A61C 8/0039* (2013.01);
(Continued)

(58) Field of Classification Search
CPC ... A61C 8/0033; A61C 8/0036; A61C 8/0039; A61C 8/0042; A61C 8/0043;
(Continued)

(56) References Cited

U.S. PATENT DOCUMENTS

| 3,974,734 A | 8/1976 | Machtle |
| 4,525,145 A | 6/1985 | Scheicher |

(Continued)

FOREIGN PATENT DOCUMENTS

| DE | 19705571 A1 | 9/1998 |
| EP | 1018319 A1 | 7/2000 |

(Continued)

OTHER PUBLICATIONS

Unofficial translation of DE19705571 A1.
Unofficial translation of EP1018319 B1.

*Primary Examiner* — Ralph A Lewis
(74) *Attorney, Agent, or Firm* — IpHorgan Ltd.

(57) ABSTRACT

A dental device comprises: a dental implant comprising a core enveloped by an expandable anchor comprising a plurality of joined segments. Prior to insertion of the core into the expandable anchor a carrier apically displaces within the expandable anchor, generating an expansion force causing the plurality of joined segments to be displaced linearly away from the central axis of the implant where the coronal and apical ends of each joined segment are displaced in parallel paths normal to the central axis of the implant. The core inserts into the expandable anchor to lock the plurality of joined segments in their expanded configuration. At least a first rail on the core is received by a corresponding expandable anchor slot to align the core and expandable anchor and at least a first core and expandable locking lodge engage to lock the core into the expandable anchor.

43 Claims, 15 Drawing Sheets

(52) U.S. Cl.
CPC .......... *A61C 8/0042* (2013.01); *A61C 8/0043* (2013.01); *A61C 8/0062* (2013.01); *A61C 8/0069* (2013.01); *A61C 8/0074* (2013.01); *A61C 8/0098* (2013.01); *A61C 2008/0046* (2013.01)

(58) Field of Classification Search
CPC ... A61C 8/0062; A61C 8/0069; A61C 8/0074; A61C 8/0098; A61C 2008/0046; A61B 17/8858; A61B 17/8852; A61B 17/7258; A61B 17/7266
USPC ......... 433/172–176, 201.1; 623/16.11–23.63
See application file for complete search history.

(56) References Cited

U.S. PATENT DOCUMENTS

| | | | |
|---|---|---|---|
| 5,062,800 A | 11/1991 | Niznick | |
| 5,141,435 A | 8/1992 | Lillard | |
| 5,439,381 A * | 8/1995 | Cohen | A61C 8/001 433/173 |
| 5,538,428 A | 7/1996 | Staubli | |
| 5,890,902 A | 4/1999 | Sapian | |
| 5,931,674 A | 8/1999 | Hanosh et al. | |
| 6,129,763 A * | 10/2000 | Chauvin | A61F 2/446 623/17.11 |
| 6,227,860 B1 | 5/2001 | Hobo | |
| 6,309,220 B1 | 10/2001 | Gittleman | |
| 6,332,778 B1 * | 12/2001 | Choung | A61C 8/0033 433/172 |
| 6,991,461 B2 | 1/2006 | Gittleman | |
| 8,167,619 B2 * | 5/2012 | Vachtenberg | A61C 8/0033 433/173 |
| 8,486,120 B2 * | 7/2013 | Shimko | A61C 8/0074 411/55 |
| 2001/0012606 A1 | 8/2001 | Unger | |
| 2003/0124488 A1 | 7/2003 | Gittleman | |
| 2005/0131409 A1 * | 6/2005 | Chervitz | A61F 2/30771 606/247 |
| 2009/0208905 A1 * | 8/2009 | Vachtenberg | A61C 8/0033 433/173 |
| 2010/0304333 A1 | 12/2010 | Ghavidel | |
| 2011/0143316 A1 | 6/2011 | Olson et al. | |
| 2011/0282396 A1 * | 11/2011 | Shimko | A61C 8/0033 606/303 |
| 2012/0058451 A1 | 3/2012 | Lazarof | |
| 2012/0270181 A1 | 10/2012 | Shribman et al. | |
| 2013/0340240 A1 | 12/2013 | Irawan | |
| 2014/0363787 A1 * | 12/2014 | Tissi | A61C 8/0022 433/174 |

FOREIGN PATENT DOCUMENTS

| | | |
|---|---|---|
| KR | 20020072632 A | 9/2002 |
| KR | 2004/0037967 A | 5/2004 |
| WO | 2006006923 A1 | 1/2006 |
| WO | 2008112308 A1 | 9/2008 |
| WO | 2012091681 A2 | 7/2012 |
| WO | 2013/186765 A1 | 12/2013 |
| WO | 2014/164923 A1 | 10/2014 |

* cited by examiner

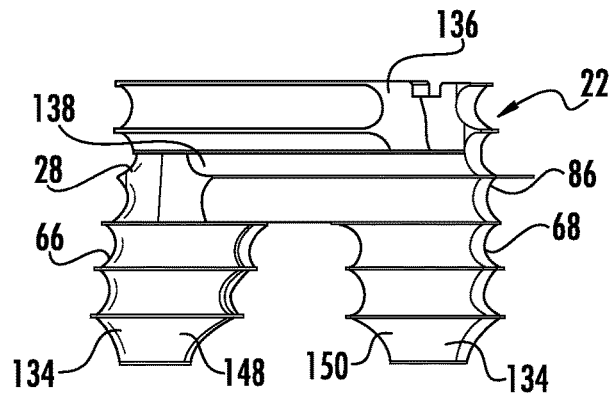
FIG. 26
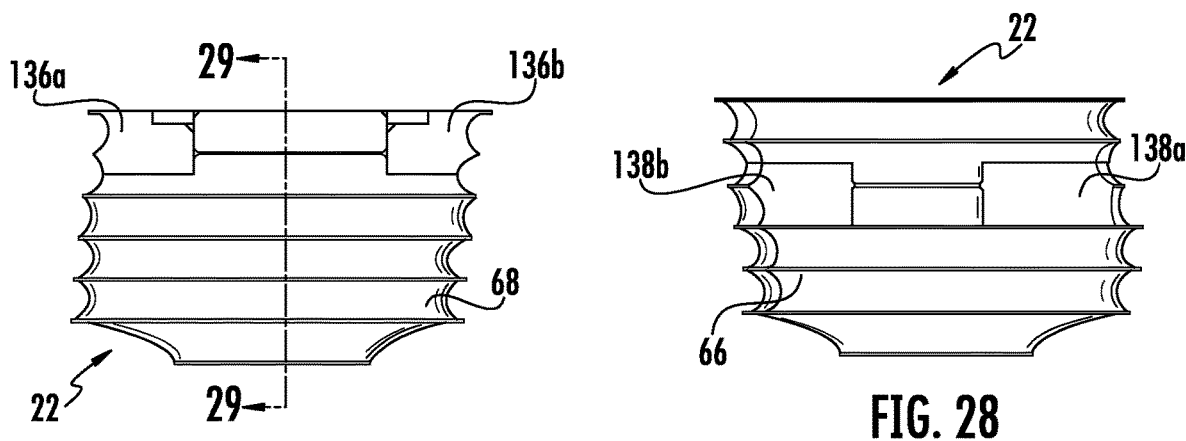
FIG. 27
FIG. 28
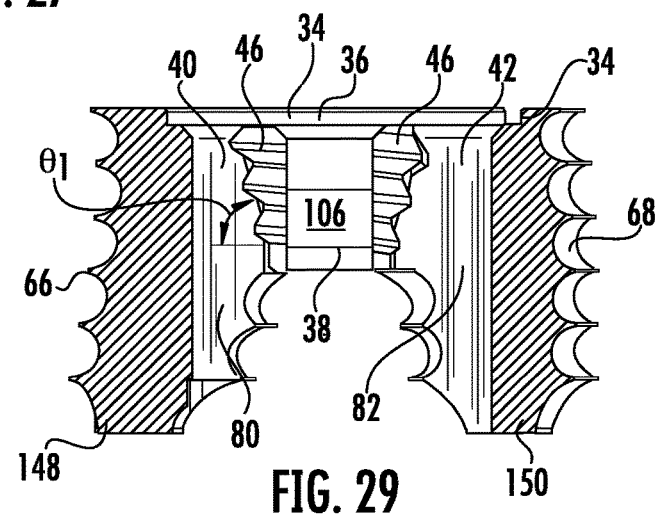
FIG. 29

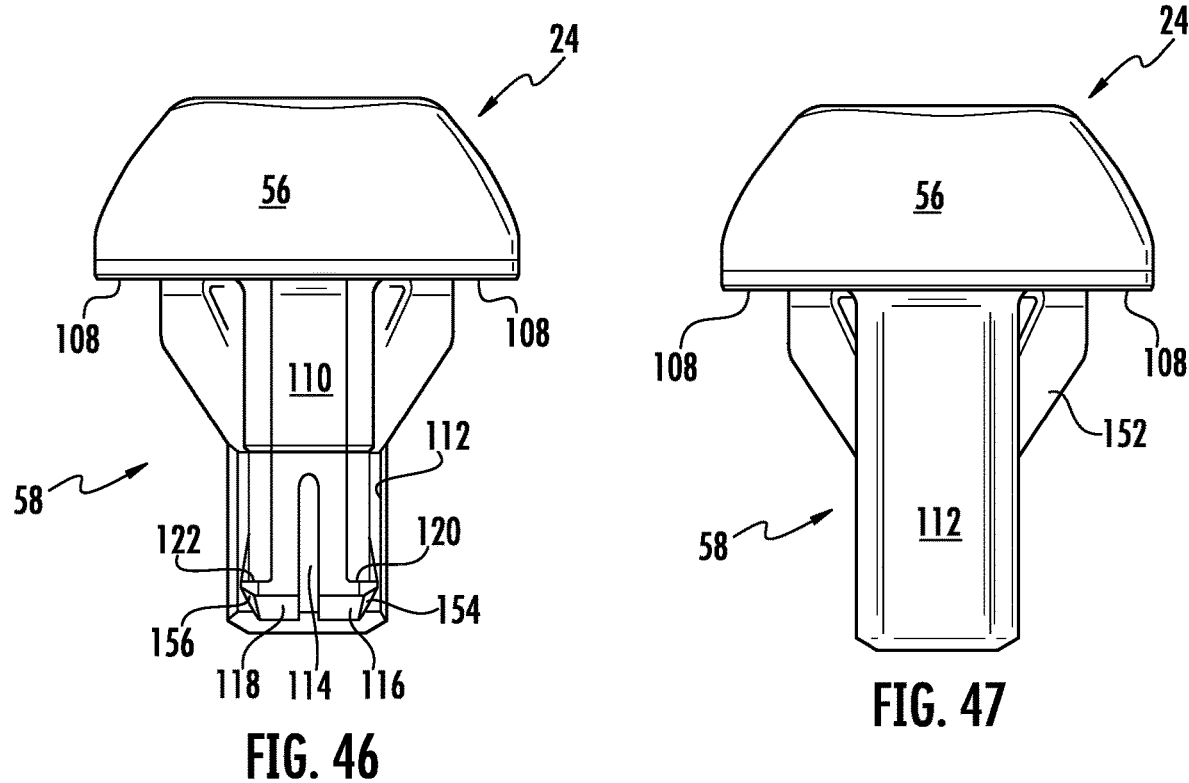
FIG. 46
FIG. 47
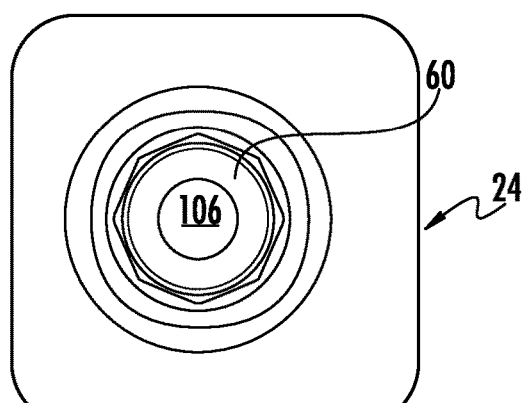
FIG. 48

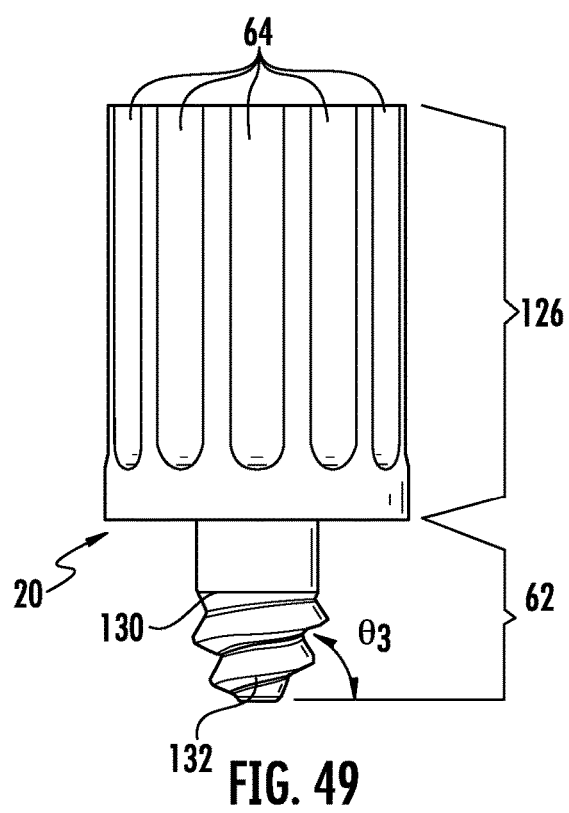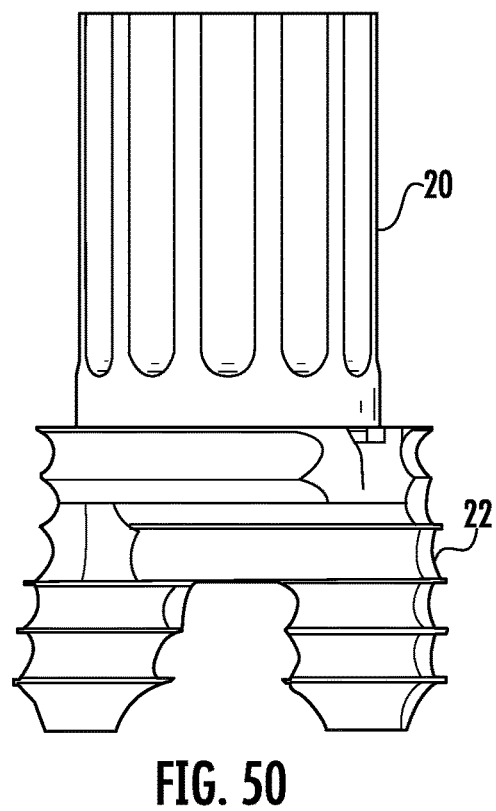

DENTAL IMPLANT

CROSS-REFERENCE TO RELATED APPLICATIONS

This application is a National Phase application of International Application No. PCT/US2015/055012, filed on Oct. 9, 2015, which in turn claims priority to New Zealand Provisional Patent Application Nos.: 701110, filed on Oct. 17, 2014; 706774, filed Apr. 8, 2015; and 707717, filed May 4, 2015, the contents of which are all hereby incorporated by reference.

FIELD OF THE INVENTION

This invention relates generally to the field of dentistry and more specifically to dental implants.

BACKGROUND OF INVENTION

The field of prosthodontics deals with the replacement, rehabilitation and, maintenance of the oral function, comfort, appearance and, health of patients with clinical conditions associated with missing or deficient teeth. To replace a natural tooth, a dentist uses a variety of devices of which implant, abutment, and crown are significant.

The majority of implants used today are made of titanium and are available in various sizes and shapes. A two-stage surgical protocol is used for the placement of a dental implant. Usually, the first stage is the extraction of the tooth. Several months are required to allow new bone growth to heal the extracted socket. The second stage is when a hole is drilled into the bone and the implant is screwed in. The entire procedure is time consuming, expensive, requires extensive technical skill, and is carried out over several visits to the dentist causing additional distress to the patient.

It is also possible to place an immediate dental implant directly into an extraction socket, but this requires drilling deeper into the base of the socket to obtain sufficient stability. Many general dentists refuse to carry out this procedure due to the perceived high risk of damaging adjacent nerves and/or nasal sinuses. Once the implant has osseointegrated into the bone, a permanent crown is placed.

The above surgical implant procedure requires a level of skill and confidence that is beyond many general dentists. Primarily, many general dentists are anxious about drilling into bone and prefer to refer such patients to specialists. They are also concerned about the high cost of the surgical equipment required of relatively infrequent procedures.

The object of this invention is to provide a dental implant that can be fitted immediately after tooth extraction. It is another object of the invention to enable placement of a dental implant without having to drill into the jaw bone. It is yet another object of this invention to allow for fast osseointegration directly around and into the placed implant. It is also the object of the invention to provide a kit of different sized and shaped dental implants that fits most tooth sockets.

SUMMARY OF THE INVENTION

The present invention claims priority to New Zealand Provisional Patent Application Nos. 701110 filed on Oct. 17, 2014, 706774 filed on Apr. 8, 2015, and 707717 filed on May 4, 2015, the contents of which are incorporated herein by reference.

The invention is a adental device comprising: a dental implant for fitting into a tooth socket after extraction of a native tooth, the dental implant having a coronal end, an apical end, and a central axis extending through the coronal end and the apical end, the dental implant further comprising: (a) a dental prosthesis receptacle at the dental implant coronal end; (b) a core comprising a coronal portion and an apical portion; (c) an expandable anchor comprising a coronal end, an apical end, and a plurality of joined segments, each including a coronal end and an apical end, the expandable anchor transformable from a first, unexpanded position to a second expanded position in response to an expansion force wherein the coronal end and apical end of each of the plurality of joined segments of the expandable anchor are displaced in parallel paths normal to the central axis in response to the expansion force, and (d) an inner form in the expandable anchor configured to receive the core and lock the plurality of joined segments in position when the expandable anchor is in the second, expanded position. In a first embodiment of the invention, the dental implant is a single root replicating a native tooth having a single root and in another embodiment of the invention the dental implant is a multi-root replicating a native tooth having multiple roots. The dental device further comprises a carrier including an engagement end configured to mate with the expandable anchor and wherein the carrier is apically displaced in the expandable anchor along the central axis to generate the expansion force.

The object of this invention is to provide a dental implant that can be fitted in a patient's tooth socket immediately after tooth extraction. It is another object of the invention to enable placement of the invention without having to drill into the jaw bone. It is also therefore an object of this invention to reduce risks associated with the placement of an immediate dental implant by using a procedure free from drilling. It is also an object of this invention to reduce the risks associated with the placement of an immediate dental implant. It is yet another object of this invention to allow for fast osseointegration directly around and into the structure of the implant. It is also the object of the invention to provide a system consisting of implants and trial models of different sizes required to fit a range of tooth sockets.

The device is a dental implant to be placed in a tooth socket immediately after the extraction of the tooth consisting of a core and an outer envelope. The device may also consist of a carrier component that allows for the easy placement of the outer envelope. The carrier component additionally allows for the determination of the size of core required. The device is made of one or more biocompatible materials such as metal, ceramic, and/or plastic.

The device is a system consisting of a range of different sizes of dental implants and trial models, wherein the trial models are structural replicas of the dental implants, and the dental implants are placed in a tooth socket immediately after extraction of the tooth.

BRIEF DESCRIPTION OF DRAWINGS

FIGS. 26-28, 33-35, 39-41, 45-47, and 49-50 are elevation views of the multi-root embodiment of the present inventive dental device;

FIG. 29 is a cross-section view of the multi-root embodiment of the present inventive dental device taken along section 27-27 in FIG. 27;

FIGS. 30, 36, 42, and 48 are top plan views of the multi-root embodiment of the present invention;

DETAILED DESCRIPTION OF DRAWINGS

Figure 1:
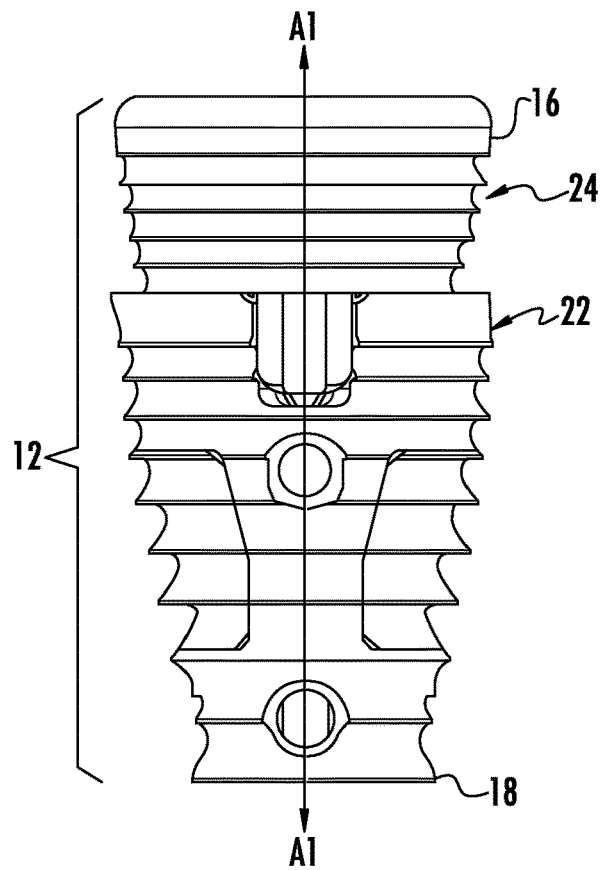
FIG. 1 shows a side elevation view of a first, single-root, embodiment of the present inventive dental device.
Figure 2:
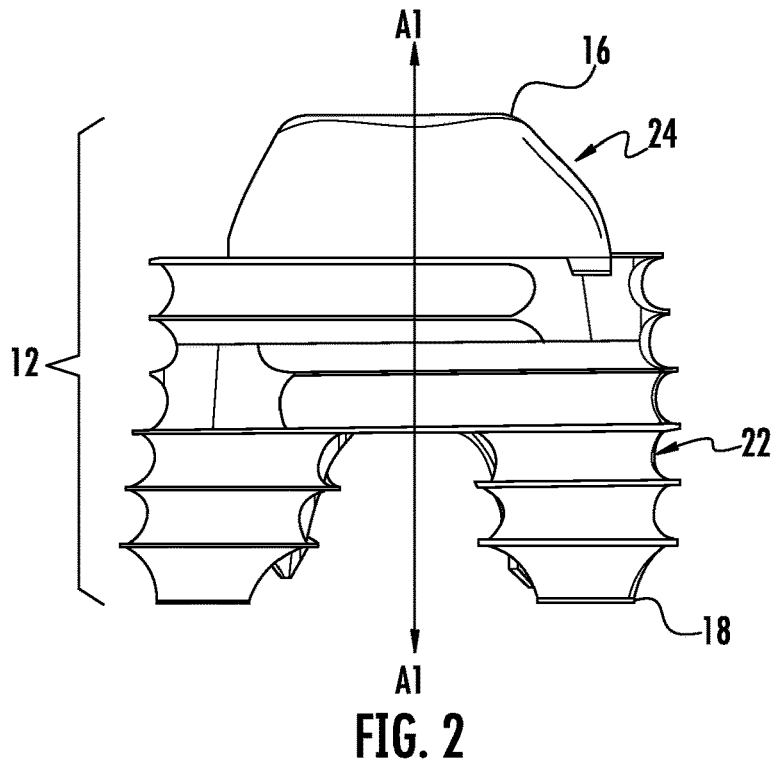
FIG. 2 shows a side elevation view of a second, multi-root, embodiment of the present invention.
Figure 3:
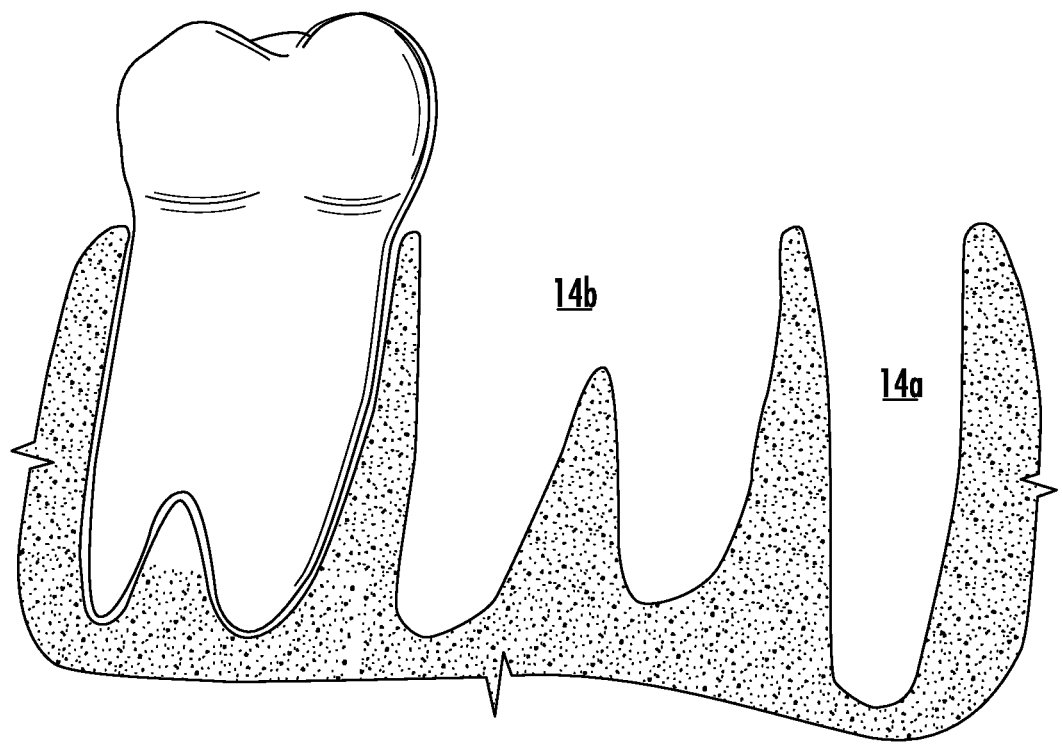
FIG. 3 shows a side elevation view of a tooth socket into which a dental device according to the first or second embodiment is inserted.
Figure 4:
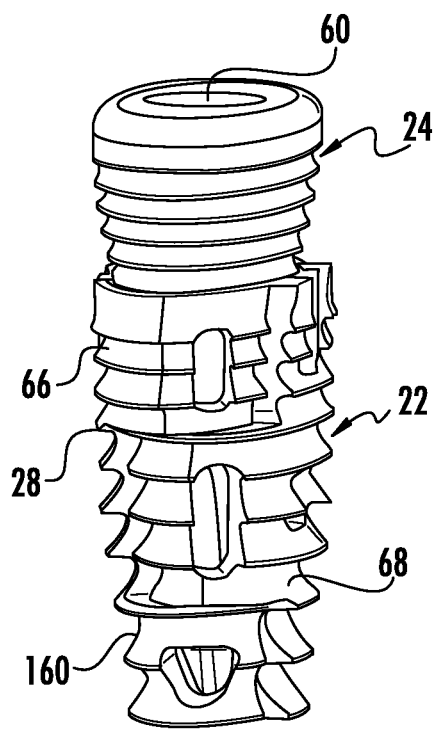
FIGS. 4, 8-9, 11, and 15 are perspective views of the single-root embodiment of the present inventive dental device.
Figure 5:
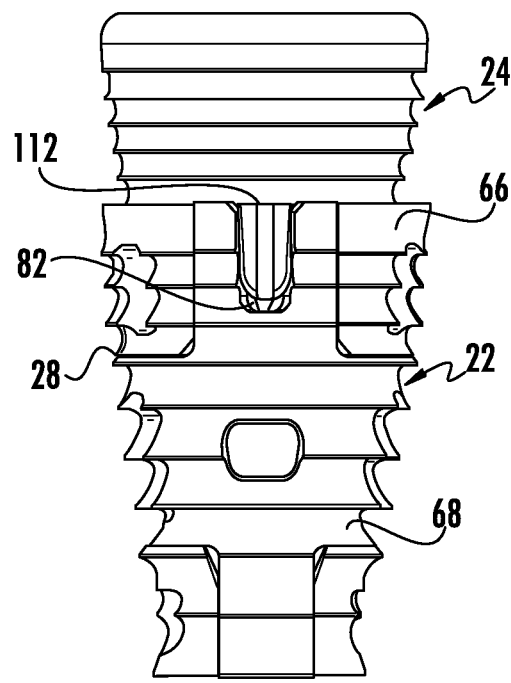
FIGS. 5-7, 12-14, 16-21, and 24-25 are elevation views of the single-root embodiment of the present inventive dental device.
Figure 6:
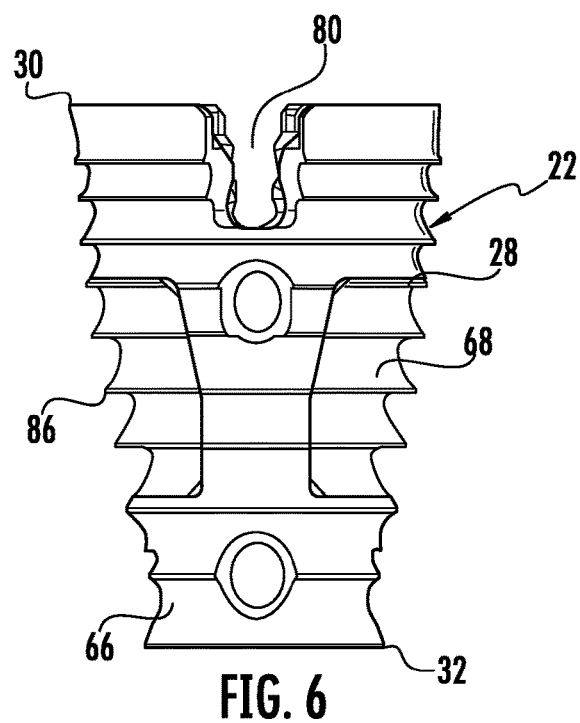
Figure 7:
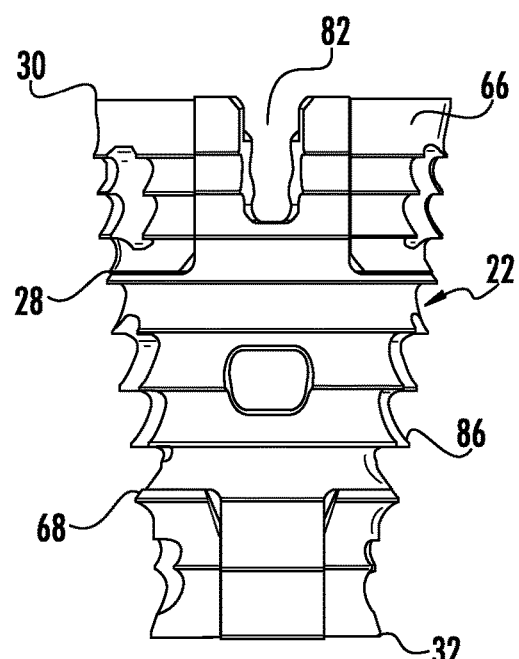

The attached FIGS. 1-50 show a first and second embodiment of the present inventive dental device 10 for secure placement of a dental implant 12 into a tooth socket 14a or 14b (FIG. 3) immediately after extraction of the native tooth. Whenever possible, the same reference numbers are used in multiple figures to identify common elements. As seen in the attached figures, the present inventive dental device 10, across all of the disclosed embodiments, includes a coronal end 16, apical end 18, a central axis A1 extending from the coronal end to the apical end, and comprises: the dental implant 12, and carrier 20. The dental implant comprises an expandable anchor 22 and a core 24.

In operation, the dental device 10 functions by the carrier 20 first engaging the expandable anchor 22. Displacement of the carrier 20 in an inner form 26 of the expandable anchor 22 along the central axis A1 generates an expansion force causing a plurality of individual joined segments 28 forming the expandable anchor to expand in a plane normal to the central axis A1. This secures the expandable anchor 22 of the dental implant 10 into the tooth socket 14a or 14b. The plurality of joined segments 28 of the expandable anchor 22 each include a coronal end 30 and an apical end 32 and the coronal and apical ends displace in parallel, linear paths normal to the central axis A1 in response to the expansion force. Once the plurality of joined segments 28 are expanded from a first, unexpanded position to a second, expanded position to fit the tooth socket 14a or 14b the carrier 20 disengages the expandable anchor 22 and the core 24 inserts into the expandable anchor 22 to lock the plurality of joined segments 28 into position.

A recess 34 is disposed at the top of each of the joined segments 28 such that when the plurality of joined segments 28 are joined together the plurality of recesses 34 form a circumferential rim 36. The circumferential rim 36 provides a seat for the core 24 and enables the coronal ends 30 of the joined segments 28 to envelope at least a portion of the core 24. When the expandable anchor 22 is assembled the plurality of joined segments 28 form an inner form 26 including an expandable central portion 38 and a first and second peripheral portion 40, 42 on opposite sides of the expandable central portion 38. The expandable central portion 38 further comprises a tapered hollow 44 having a first taper angle $\Theta_1$ and includes a first helical thread 46 along at least a portion of the expandable central portion 38. At least one expandable anchor slot 48 receives a corresponding core rail 50 on the core 24 to properly align the expandable anchor 22 and core 24. At least one expandable anchor locking ledge 52 corresponds to and engages a core locking ledge 54 to lock the expandable anchor 22 and core together 22.

The core 24 is selected from a variety of sizes corresponding to the amount of expansion of the expandable anchor 22 and inserts into the expandable anchor 22 once the expandable anchor 22 is seated in the tooth socket 14a or 14b and the plurality of joined segments 28 are expanded to their second position. The core 24 comprises a coronal portion 56 and an apical portion 58. At least one core rail extends from the coronal portion 56 and is received by the corresponding expandable anchor slot 48. The rail-and-slot arrangement enables proper alignment of the expandable anchor 22 and the core 24. In the embodiments shown and described herein the core 24 comprises a first and a second core rail, with each of the core rails being of a different, unique size or configuration resulting in a single, proper alignment between the expandable anchor 22 and core 24. The coronal portion 56 of the core 24 further comprises a dental prosthesis receptacle 60 configured to receive a tooth abutment, healing cap or restorative dental device. The dental prosthesis receptacle 60 is separated from the inner form 26 of the expandable anchor 22, precluding communication between the dental prosthesis receptacle and the inner form of the expandable anchor. Sealing the inner form 26 from the outside environment is hygienically beneficial for prevent infection or other complications at the implant site.

The carrier 20 comprises an engagement end 74 enabling the carrier 20 to mate with the expandable anchor 22 for placement of the expandable anchor 22 into the tooth socket 14a or 14b and to generate the expansion force. The carrier 20 further comprises at least a first marker 64, and comprises at least a first and second marker in the embodiments shown and described herein, indicating the amount of expansion of the expandable anchor to aid in selection of the properly sized core 24.

The components of the dental device 10 are made of biocompatible material such as metal, ceramic or suitable plastic.

Specific details of the single-root and multi-root embodiments of the present invention, in addition to the common characteristics discussed above, are below.

1. Single Root Embodiment

FIGS. 1 and 4-25 show the single-root embodiment of the present invention wherein the dental implant 12 comprises a single root 160 corresponding to a tooth socket 14a (FIG. 3) of a native tooth having a single root. The expandable anchor 22 comprises the plurality of joined segments 28 and in this embodiment the plurality of joined segments 28 comprises a first and second joined segment 66, 68. The first joined segment 66 comprises a first, upper pair of arms 70 at the coronal end 30 of the joined segment 66 and a second, lower pair of arms 72 at the apical end 32 of the joined segment 66. The spacing of the first, upper and second, lower set of arms 70, 72 forms receiving spaces 74, 76 configured to receive a first pair of arms 78 on the second joined segment 68. The first pair of arms 78 of the second joined segment 68 is positioned such that when the first and second joined segments 66, 68 are joined the coronal ends 30 of the joined segments 66, 68 align and apical ends 32 of the joined segments 66, 68 also align. This arrangement forms an expandable anchor 22 of uniform height. The first and second joined segments 66, 68 are nested together to the form the expandable anchor 22 and the segments engage each other in a sliding, press-fit manner.

When the expandable anchor 22 is assembled, the first and second joined segments 66, 68 define the inner form 26, which includes the expandable central portion 38, and first and second peripheral portions 40, 42 on opposite sides of the expandable central portion 38. In this embodiment the peripheral portions 40, 42 transition smoothly to the central portion 38, forming a relatively uniform inner form 26.

As described previously, the coronal ends 30 of the first and second joined segments 66, 68 each further comprise a recess 34 and when the first and second joined segments 66, 68 are joined together the recesses 34 form the circumferential rim 36 to seat the core 24. Also at the coronal end 30 of the first and/or second joined segments 66, 68 are at least one expandable anchor slot 48 corresponding to and receiving at least a one core rail 50. In the present embodiment the at least one expandable anchor slot 48 comprises a first expandable anchor slot 80 and a second expandable anchor slot 82 aligning on opposite sides of the expandable anchor 22 when the first and second joined segments 66, 68 are joined together. The first joined segment 66 includes the first expandable anchor slot 80 and the second joined 68 segment includes the second expandable anchor expandable anchor slot 82.

The coronal end of the expandable anchor 22 comprises an asymmetrical outer form 84 and outer circumference providing for various tooth sockets. In the present embodiment the asymmetrical outer form 84 at the coronal end of the expandable anchor is "egg-shaped". The apical end of the expandable anchor 22 may follow the same outer form as the coronal end or adopt a different or modified form as may be necessary for a given application. The outer surface of the expandable anchor 22 further comprises bone in-growth ridges 86 to promote better stability and osseointegration of the dental implant 12 with the surrounding bone. As shown the bone in-growth ridges 86 comprise at least a first circumferential ridges, and preferably a plurality of circumferential ridges, extending substantially perpendicular to the central axis. Alternative configurations may also be utilized, such as bone in-growth segments which are not completely circumferential or uniformly aligned. The outer surface of the expandable anchor 22 may also comprise one or more bone in-growth voids 162 for further stability and osseointegration.

In this single-root embodiment of the invention, the inner surface of the first joined segment 66 includes a recession 88 with a lip or ridge 90 at its upper margin to correspond with a ridge 92 on the carrier 20. The inner surface of the second joined segment 68 also includes a recession 94 with a lip or ridge 96 at its upper margin to correspond with the ridge 92 on the carrier 20. When the carrier 20 is received in the recessions 88, 94 of the first and second joined segments 66, 68 and the recession ridges 90, 96 of the first and second joined segments 66, 68 engage corresponding ridge 92 on the carrier, the carrier 20 is secured into engagement with expandable anchor 22.

In the first joined segment 66 the recession 88 is located in the space between the upper and lower pairs of arms 70, 72. In the second joined segment 68 the recession 94 is preferably placed to correspond to the first joined segment recession 88, enabling the ridges 90, 96 in the recessions 88, 94 to engage a single carrier ridge 92. The at least one expandable anchor locking ledge 52 is disposed on the lower portion of the inner surface of the first joined segment 66 on the second, lower pair of arms 72 and corresponds to a core locking ledge 54. Engagement of the expandable anchor and core locking ledges 52, 54 further secures the core 24 and expandable anchor 22 together. As shown, a first expandable anchor locking ledge 98 is on the first arm 72a of the lower pair of arms 72 and a second expandable anchor locking ledge 100 is on the second arm 72b of the lower pair of arms.

The core 24 of the single-root embodiment of the present invention comprises a coronal portion 56, and an apical portion 58 including a mid-section 102 and a tip 104. The apical portion 58 of the core 24 also forms the shaft of the dental implant 12. The mid-section 102 is generally frusto-conical, having a taper angle $\Theta_2$, and transitions to the tip 104. The coronal portion 56 comprises the dental prosthesis receptacle 60 by which a tooth abutment, healing cap, or similar dental device or appliance may attach to the dental implant 12. The dental prosthesis receptacle 60 may comprise a tapered hollow 106 or, alternatively a tapered protrusion. The coronal portion 56 transitions to the apical portion 58 at flat or flattened loading surface 108, where the loading surface 108 is received by the circumferential rim 36 of the expandable anchor 22 when the core 24 is deployed into the expandable anchor 22. To improve the seating of the core 24 in the circumferential rim 36 the flat loading surface 108 may be dimensioned larger than the circumferential rim 36 to press-fit the core 24 with the expandable anchor 22.

The at least one core rail 50 comprises a first and second core rail 110, 112 on the core 24 at the mid-section 102 of the apical portion 58. The first and second core rails 110, 112 are preferably configured to "dove-tail" with the first and second expandable anchor slots 80, 82 in the expandable anchor 22. The first and second core rails 110, 112 include a generally trapezoidal cross-section which fit into expandable anchor slots 80, 82 with a corresponding trapezoidal configuration. The first and second core rails 110, 112 may vary in size, configuration, and number depending on the size of the dental implant 10. As shown in the figures, the present embodiment uses a first and second asymmetrical expandable anchor slot 80, 82 and a first and second asymmetrical core rail 110, 112 providing a single, proper alignment orientation for the expandable anchor 22 and the core 24. Symmetrical expandable anchor slots 80, 82 and core rails 110, 112 and may also be used, but would enable multiple alignment orientations for the expandable anchor 22 and the core 24. This arrangement requires attention to detail when mating the expandable anchor 22 and core 24 if the expandable anchor 22 and the core 24 are concentric or co-axial.

The tip 104 at the apical portion 58 of the core 24 comprises a split 114 dividing the tip 104 into a first and a second leg 116, 118. In the single-root embodiment of the present invention the at least one core locking ledge 54 is disposed at the tip 104. As shown, a first core locking ledge 120 is on the first leg 116 and a second core locking ledge 122 is on the second leg 118. The first and second core locking ledges 120, 122 in this embodiment engage the corresponding expandable anchor locking ledges 98, 100 of the second, lower pair of arms 72 of the first joined segment 66. This arrangement is similar to a "split-bayonet" connector. In operation, the first and second legs 116, 118 compress about or are "pinched" at the split 114 as the core 24 is deployed into the expandable anchor 22. This enables the core locking ledges 120, 122 to slide over the corresponding expandable anchor locking ledges 98, 100 of the first joined segment 66. Once the core locking ledges 120, 122 slide over the corresponding expandable anchor locking ledges 98, 100 the first and second legs 116, 118 return to their initial, uncompressed positions, precluding the core locking ledges 120, 122 and expandable anchor locking ledges 98, 100 from disengaging.

The carrier 20 of the single-root embodiment comprises a handle 124, shaft 126, and engagement end 62. The handle 124 allows for use of the carrier 20 with a tool, such as a torque wrench, or by hand. The shaft 126 comprises the at least one marker 64, and preferably at least a first and second marker, indicating the amount of expansion of the expandable anchor 22 from the first, unexpanded position to the second, expanded position and correspond to the size of the core 24 required. The engagement end 62 comprise a partial replica of the core 24, enabling the engagement end 62 to fit into and mate with the expandable anchor 22. In this embodiment the engagement end 62 comprise a frusto-conical tip 128 and tapered section 130 including a second helical thread 132 corresponding to the first helical thread 46 in the inner form 26 of the expandable anchor 22. The frusto-conical tip 128 is configured to be received in recesses 88, 94 of the first and second joined segments 66, 68, with the top surface of the tip 120 engaging the upper margin lip 90, 96 in each of the recessions 88, 94. The taper angle $\Theta_3$ of the tapered section 130 of the engagement end 62 corresponds with the taper angle $\Theta_1$ of the tapered hollow 26 of the expandable anchor 22. The tapered section 130 of the engagement end 62 enables the carrier 20 to cam the joined segments 66, 68 of the expandable anchor 22 apart as the carrier 20 is screwed into the expandable anchor 22.

The expandable anchor 22 is assembled on the carrier 20 and delivered to the tooth socket 14a for insertion and expansion. The expandable anchor 22 is carefully positioned in the tooth socket 14a and when in a satisfactory position, the carrier 20 is rotated to generate the expansion force required to expand the expandable anchor 22 from the first, unexpanded position to the second, expanded position. The carrier 20 is rotated using a torque wrench or by hand to a predetermined force.

Figure 8:
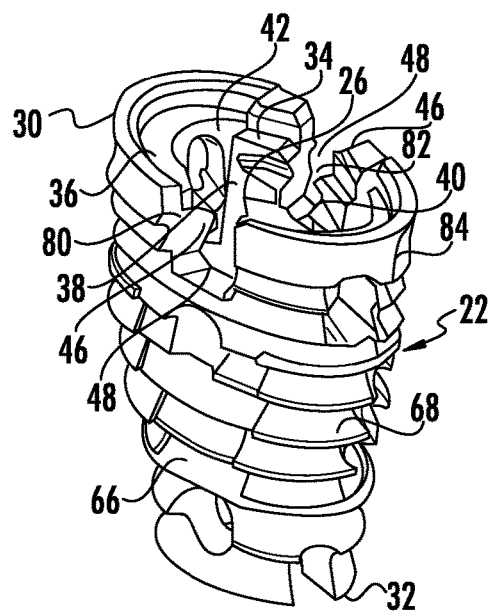
Figure 9:
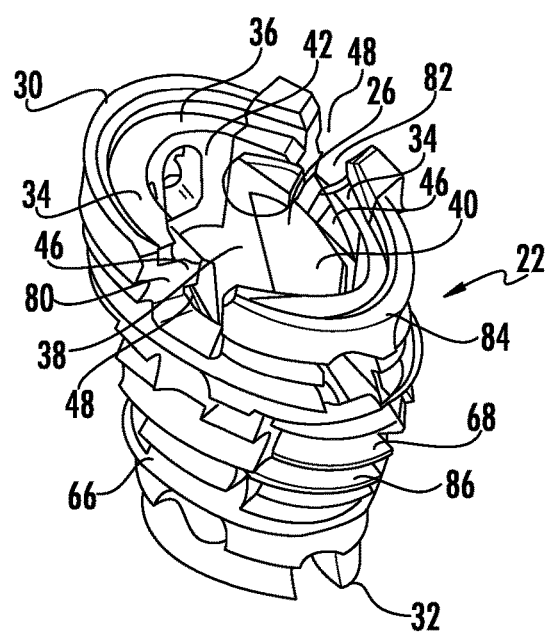
Figure 10:
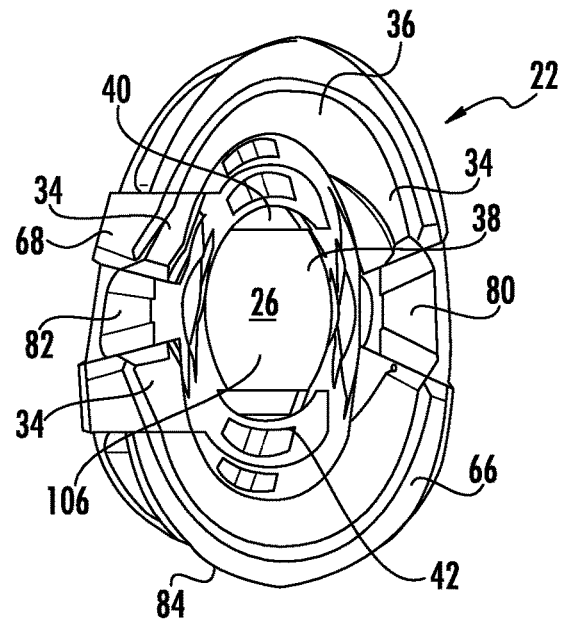
FIGS. 10 and 22 are top plan views of the single-root embodiment of the present inventive dental device.
Figure 11:
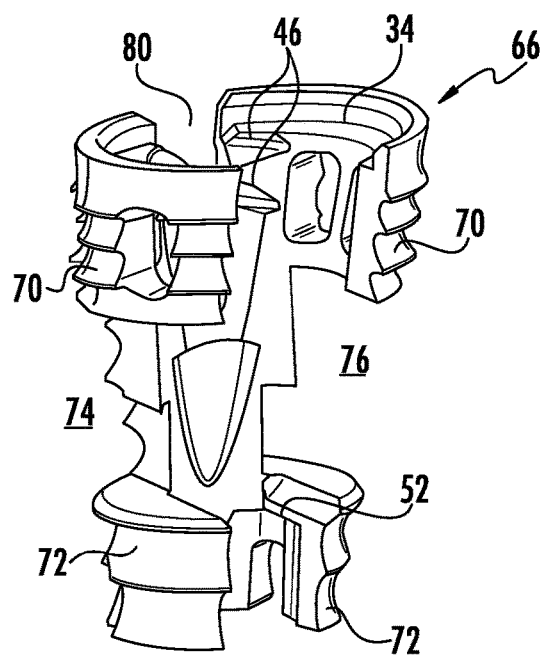
Figure 12:
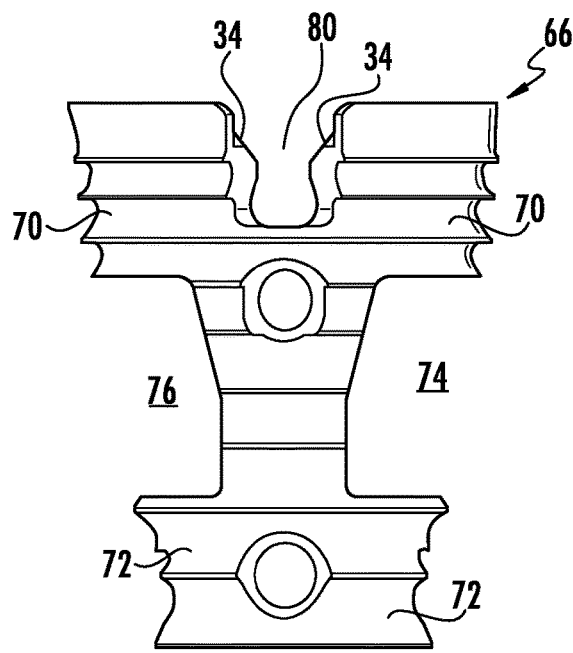
Figure 13:
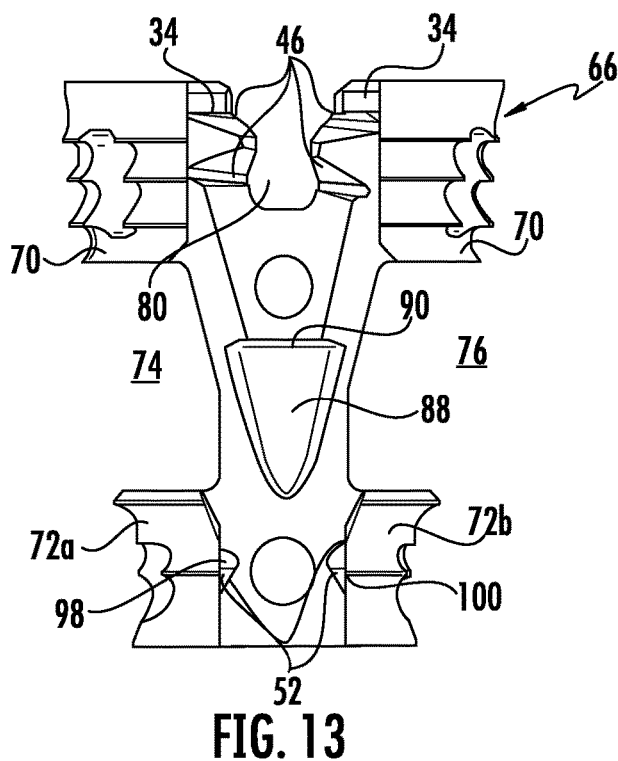
Figure 14:
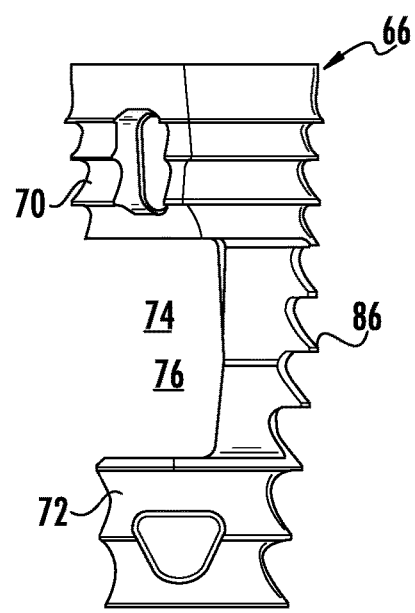
Figure 15:
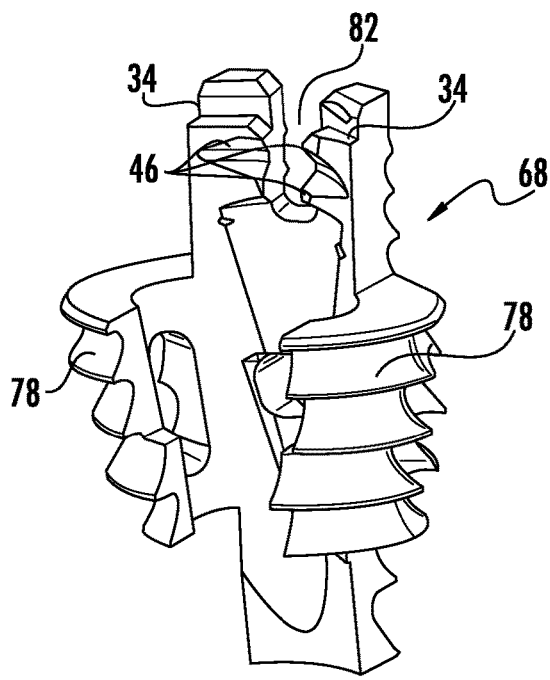
Figure 16:
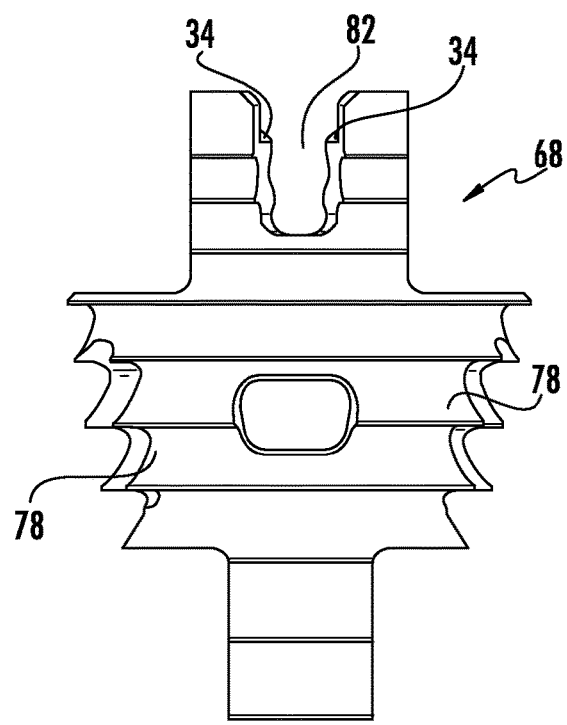
Figure 17:
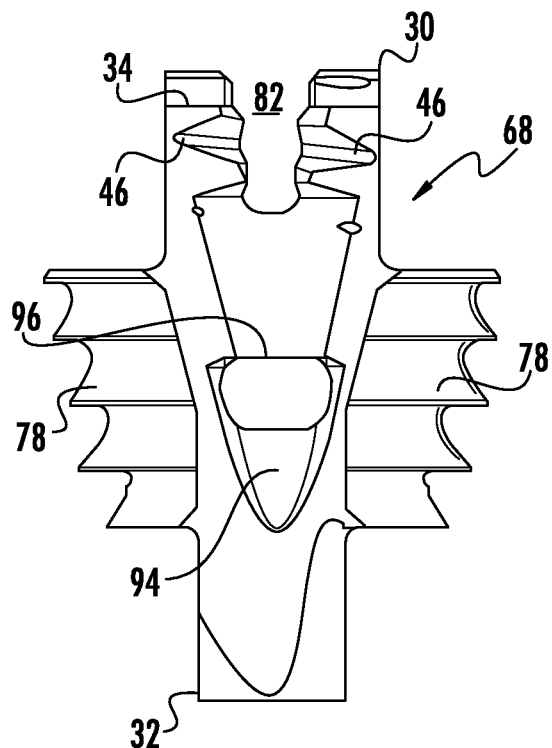
Figure 18:
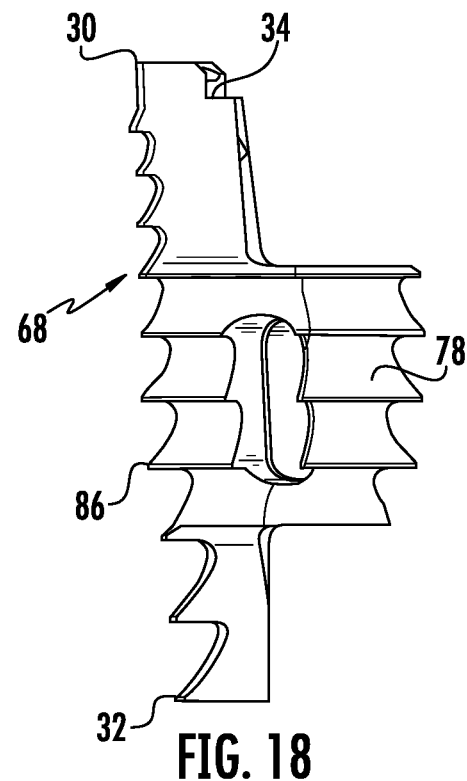
Figure 19:
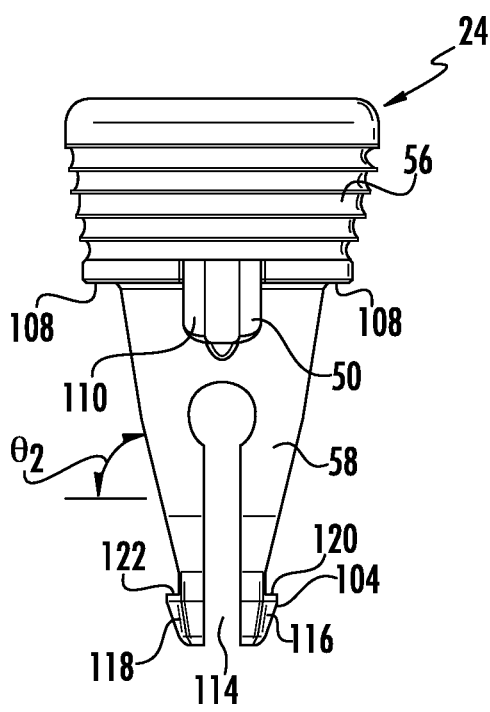
Figure 20:
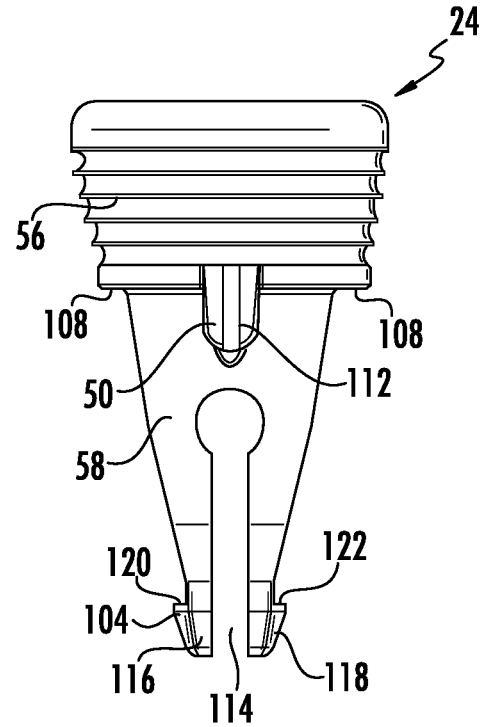
Figure 21:
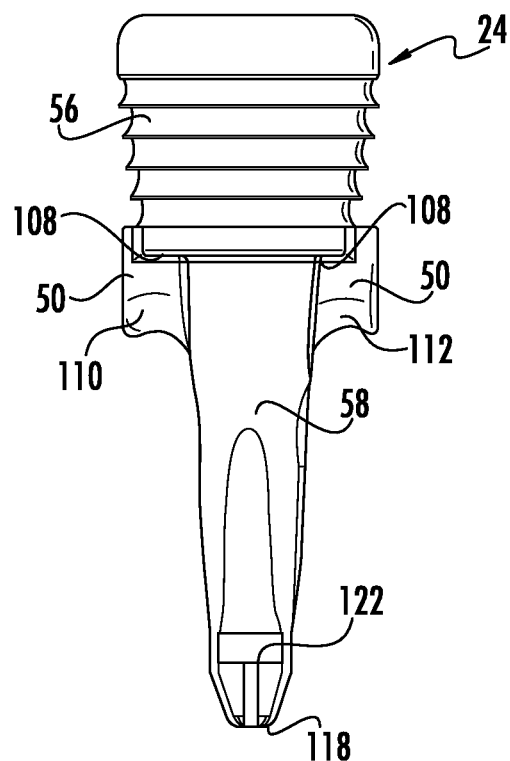
Figure 22:
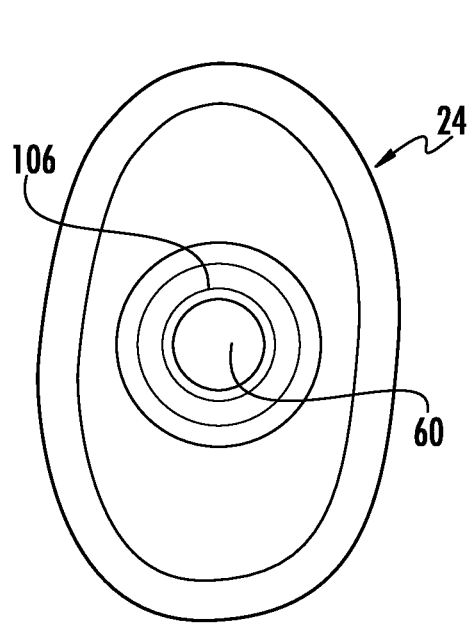
Figure 23:
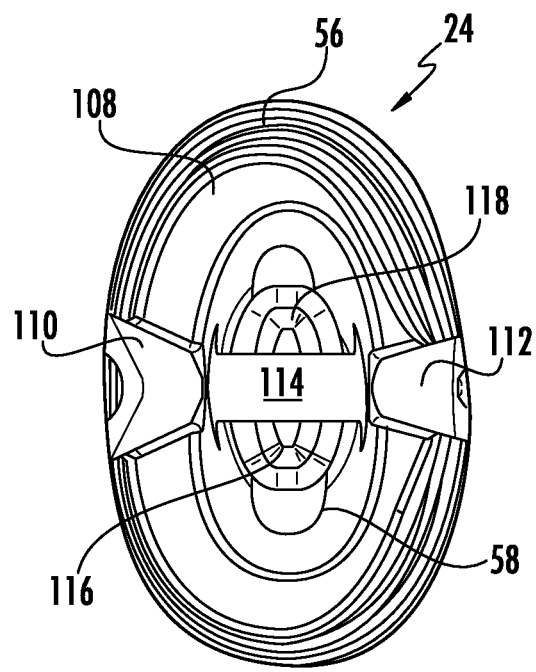
FIG. 23 is a bottom plan view of the single-root embodiment of the present inventive dental device.
Figure 24:
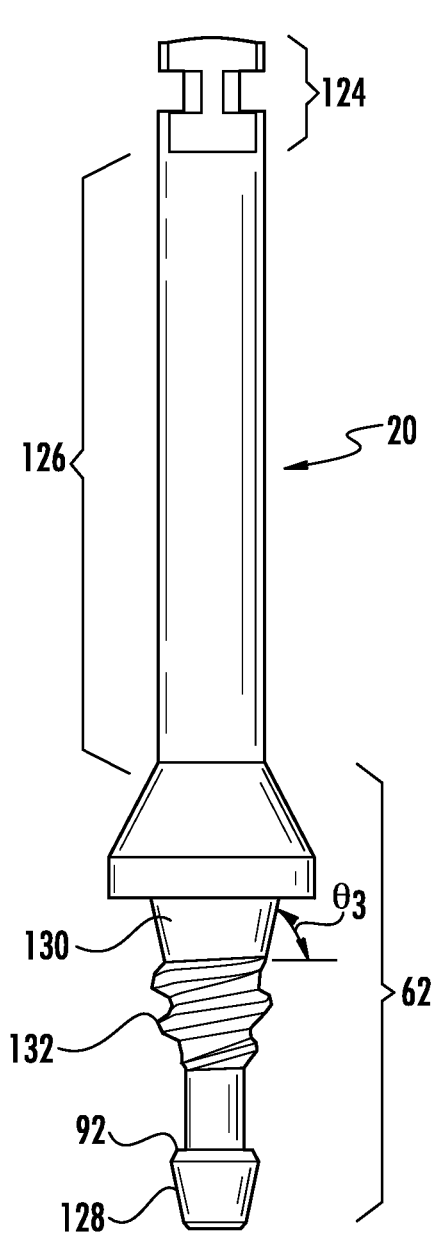
Figure 25:
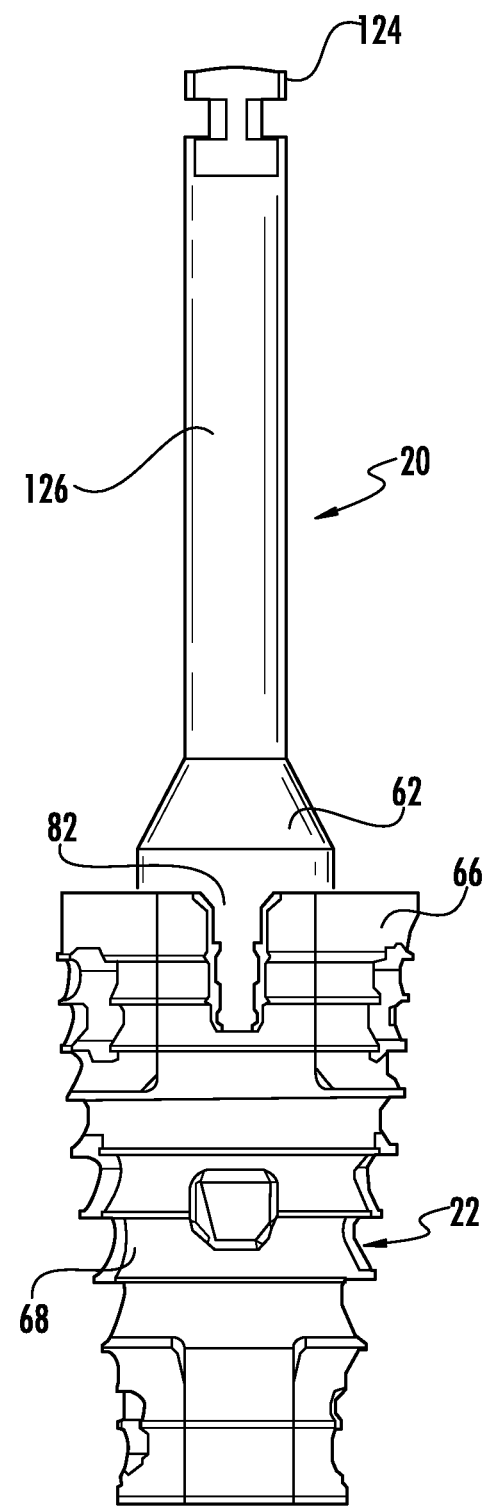
Figure 30:
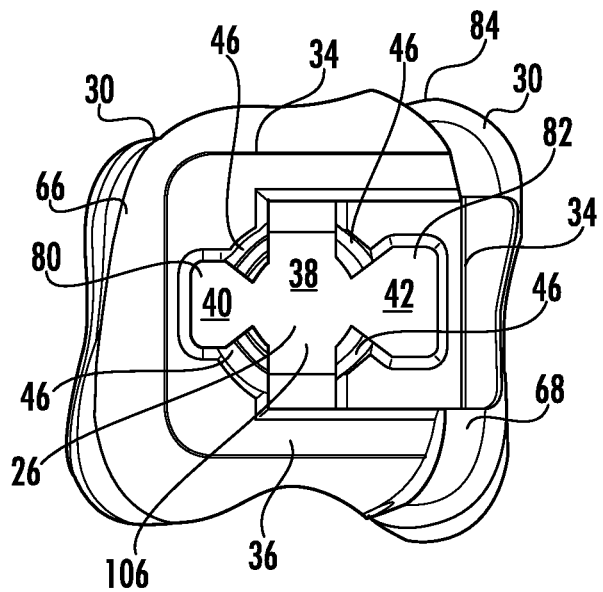
Figure 31:
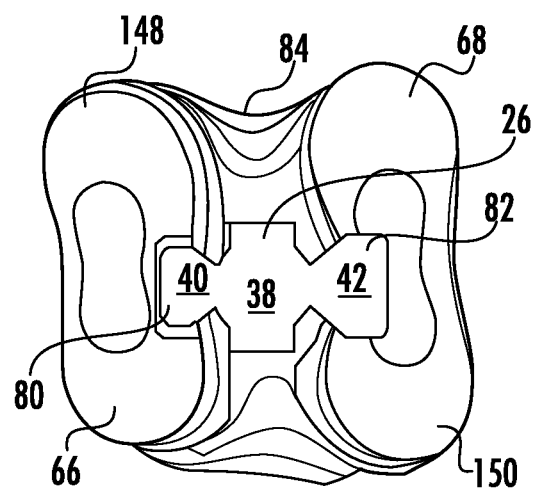
FIGS. 31, 37, and 43 are bottom plan views of the multi-root embodiment of the present invention.
Figure 32:
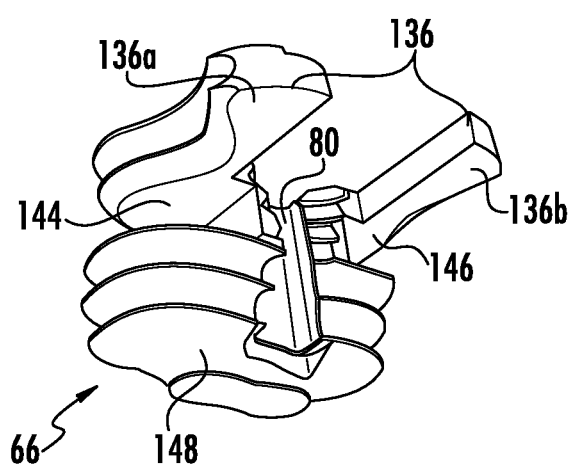
FIGS. 32, 38, and 44 are perspective views of the multi-root embodiment of the present invention.
Figure 33:
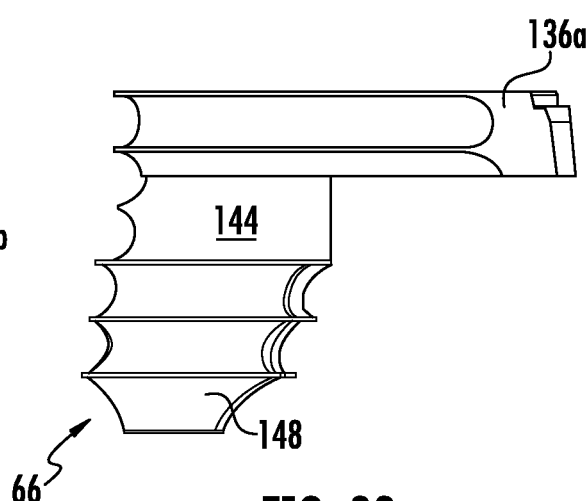
Figure 34:
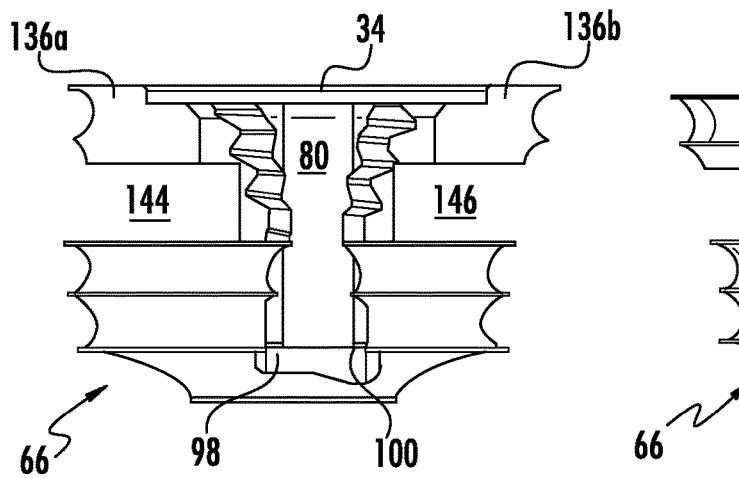
Figure 35:
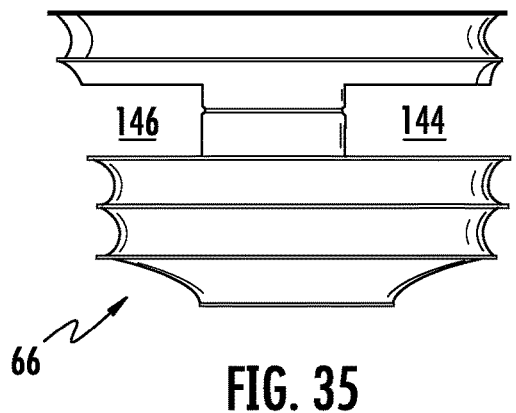
Figure 36:
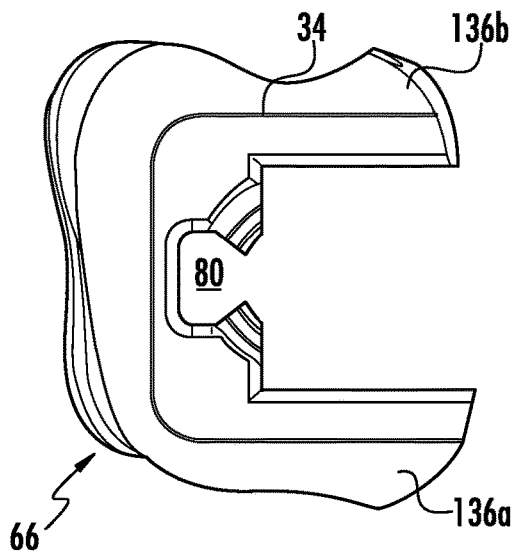
Figure 37:
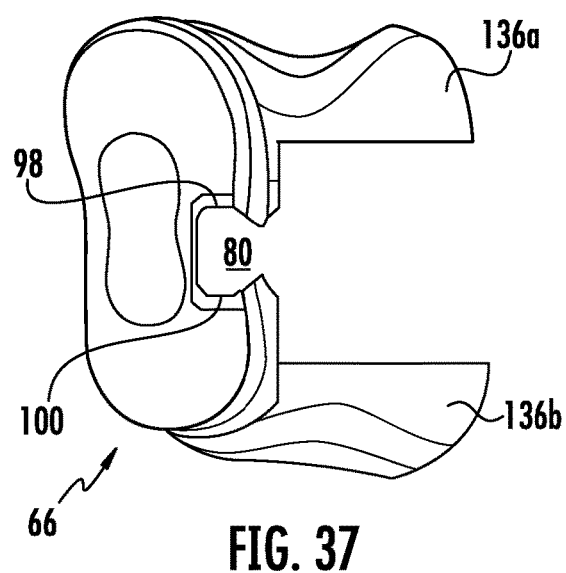
Figure 38:
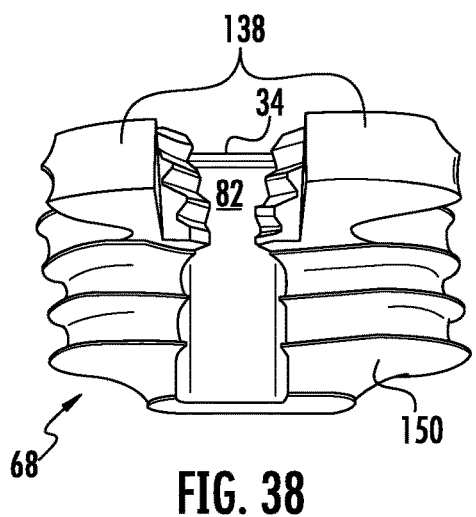
Figure 39:
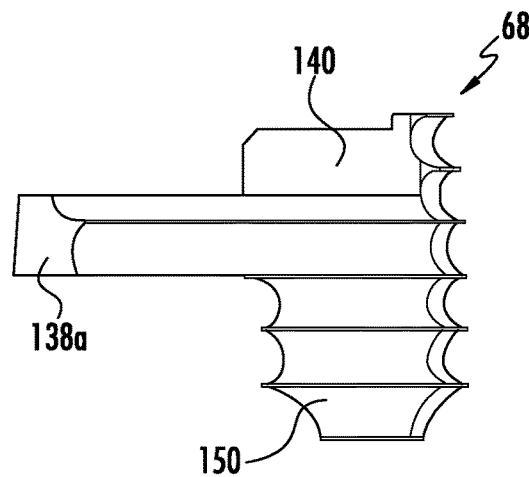
Figure 40:
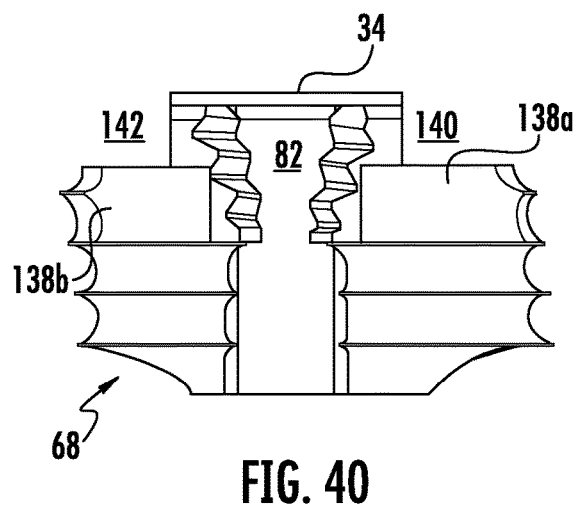
Figure 41:
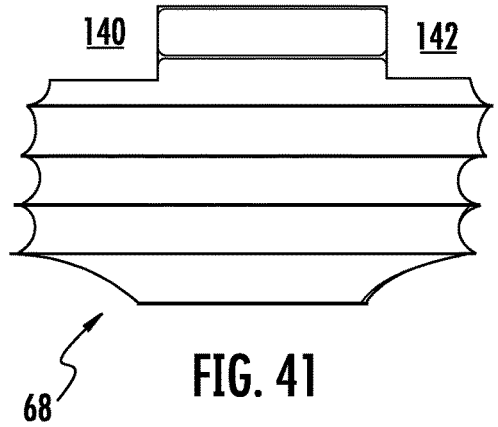
Figure 42:
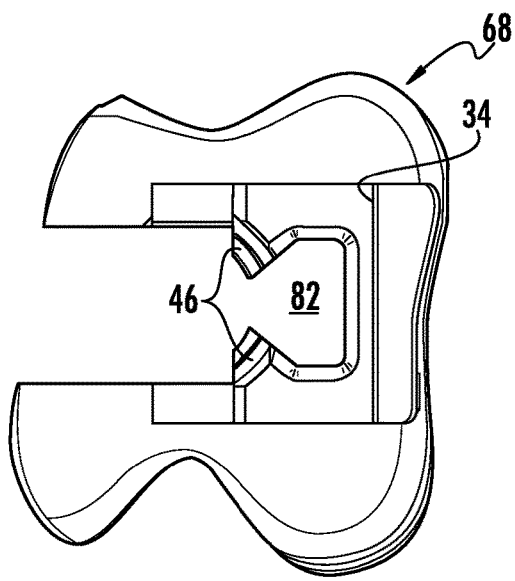
Figure 43:
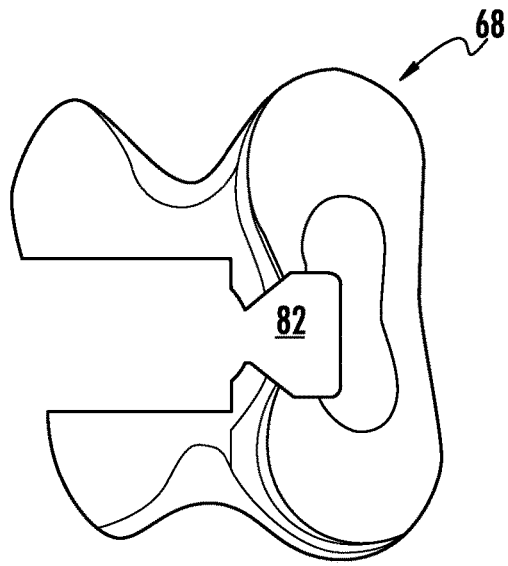
Figure 44:
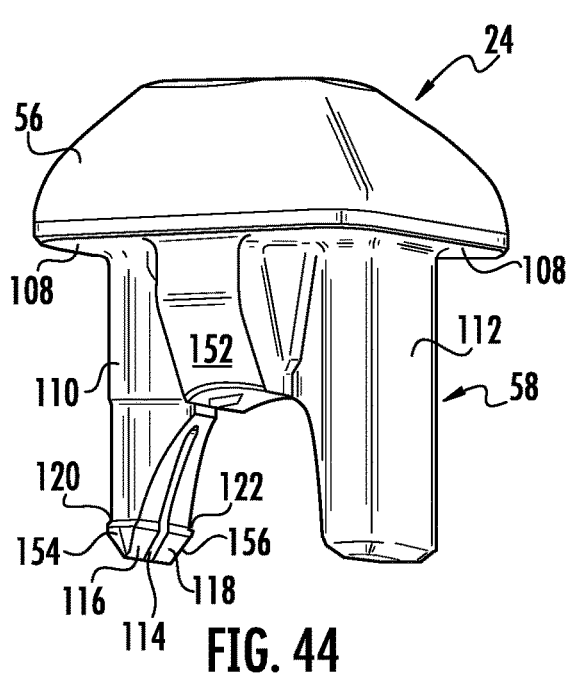
Figure 45:
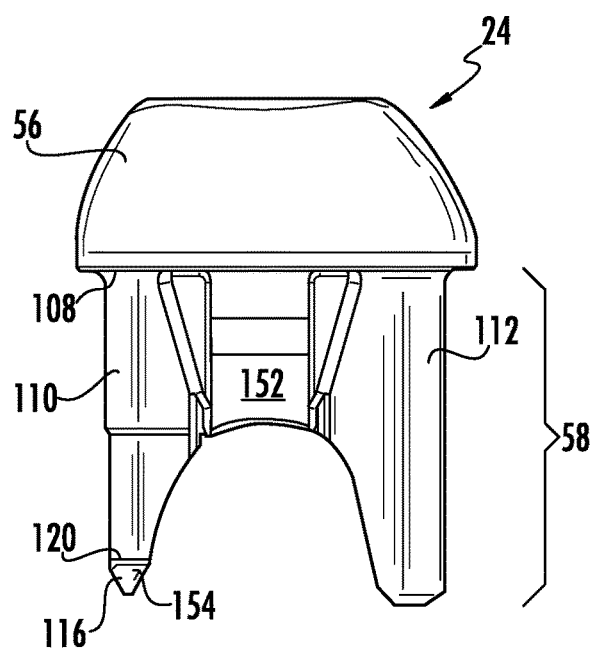

Once the first and second joined segments 66, 68 have expanded to fit the tooth socket 14a, the markings 64 on the shaft 126 indicate the size of the core 24 required to lock the first and second joined segments 66, 68 into position. FIGS. 8 and 9 show the expandable anchor in the first, unexpanded position and second, expanded position. As seen in FIG. 9, the second joined segment is laterally displaced from the first joined segment. Ideally, the markings 64 on the shaft 126 and the sizes of the core 24 will be color-coded. The core 24 may be available in two or more sizes wherein the sizes vary in length and diameter. It is also contemplated the expandable anchor 22 may be positioned and expanded using, for example, a carrier comprising a traditional hand-tool, such as an expanding pliers to apply the expansion force required to expand the plurality of joined segments 28 by a measured amount.

The single-root embodiment of the inventive dental device 10 works such that:

1. The dental professional extracts the native tooth. Occasionally, some implant sites may require the removal of septum bone that may interfere with the placement of the dental implant 12.

2. The dental professional uses the trial replicas to determine the appropriate size of dental implant 12 to fit the tooth socket 14a.

3. Based on the chosen dental implant 12 size, the carrier 20 along with the expandable anchor 22, in its unexpanded configuration, is placed in the tooth socket 14a in the correct orientation. The carrier 20 is rotated (using a wrench or similar) to expand the first and second joined segments 66, 68 of the expandable anchor 22 by a predetermined amount of rotational force. Once the predetermined force has been achieved, the markers 64 on the shaft 126 of the carrier 20 indicates the size of the core 24 the required for the final fitting of the dental implant 12. At this time, the size of the core 18 required is indicated by the markings on the carrier shaft in its current orientation. The marking closest to the buccal side of the tooth socket 14a indicates the correct core 24 size anticipated to provide the optimum expansion of the expandable anchor 22. The carrier 20 is unscrewed and disengaged from the expandable anchor 22, leaving the expandable anchor 22 in the tooth socket 14a.

4. The chosen size of core 24 is placed in the tooth socket 14a within the space created by the expandable implant 20. The core 24 is deployed into the expandable anchor 22 in the correct orientation by matching the corresponding core rails 110, 112 and corresponding expandable anchor slots 80, 82 in the expandable anchor 22. The rail-and-slot arrangement precludes the need to screw the core 24 in the expandable anchor 22.

5. Deployment of the core 24 into the expandable anchor 22 causes the legs 116, 118 at the tip 104 of the apical portion 58 of the core 24 to compress along the split 114 and enables the core locking ledges 120, 122 to slide over and past the expandable anchor locking ledges 98, 100 of the expandable anchor 22. Once the core locking ledges 120, 122 are past the expandable anchor locking ledges 98, 100 of the first and second legs 116, 118 at the tip 104 of the apical portion 58 of the core 24 to expand and return to their uncompressed position. Engagement of the core locking ledges 120, 122 and expandable anchor locking ledges 98, 100 lock the core 24 into the expandable anchor 22.

6. The core rails 110, 112, in the dove-tail configuration, keep the expandable anchor 22 close to the core 24 and at an optimum expanded position, without relying on socket pressure to hold the joined segments 66, 68 of the expandable anchor 22 together.

7. The core locking ledges 120, 122 and the corresponding expandable anchor locking ledges 98, 100 of the expandable anchor 22 prevent the apical end of the expandable anchor 22 from collapsing inwards. Engagement of the core locking ledges 120, 122 and expandable anchor locking ledges 98, 100 also prevents the core 24 from falling out of the expandable anchor 22, and, eventually, out of the tooth socket 14a.

8. The insertion of the core 24 into the expandable anchor 22 exerts only vertical forces, when compared to the vertical and rotational forces applied if a core is screwed into position. This decreases the torque exerted by the dental implant on the tooth socket during installation. It also decreases the damage to tooth socket due to excessive torque and/or unwanted fixture rotation.

9. The loading surface 108 of the core 24, along with the non-rotatability of the core 24, increases the loading capacity of the dental implant 12, thereby resulting in a stronger implant.

10. The dental professional places a healing abutment at the coronal portion 56 of the core 24 in the dental prosthesis receptacle 60 and sutures the socket to approximate the surrounding tissues, on occasions, the dental professional may be able to place a crown abutment immediately.

11. The implant site is allowed to heal and the dental professional reviews the site on a regular basis. The dental professional places a permanent dental prosthesis once the implant site heals.

2. Multi Root Embodiment

FIGS. 2 and 26-50 show a second, multi-root embodiment of the present invention wherein the dental implant 12 comprises multiple roots 134 corresponding to a tooth socket 14b (FIG. 3) of a native tooth having multiple roots. As with the single-root embodiment, the expandable anchor 22 comprises the plurality of joined segments 28. In the present embodiment the expandable anchor 22 the plurality of joined segments 28 comprises a first and second joined segment 66, 68, each including a coronal end 30 and an apical end 32.

The first and second joined segments 66, 68 each comprise a pair of arms 136, 138 at the coronal end of the joined segment 66, 68, with the pairs of arms 136, 138 overlapping. In the present embodiment, the pair of arms 136 of the first joined segment 66 overlies the pair of arms 138 of the second joined segment 68. The second joined segment 68 includes a first and second notch 140, 142 for receiving a corresponding arm 136a, 136b from the first joined segment 66 and the first joined segment 66 includes a first and second channel 144, 146 for receiving a corresponding arm 138a, 138b from the second joined segment 68. In this arrangement the first and second joined segments 66, 68 engage each other in a sliding, press-fit manner to form the expandable anchor 22. The pairs of arms 136, 138, notches 140, 142, and channels 144, 146 are also positioned and aligned to form an expandable anchor 22 of uniform height.

When the expandable anchor 22 is assembled the first and the second joined segments 66, 68 define the inner form 26, with the inner form including the expandable central portion 38 and first and second peripheral portions 40, 42 on opposite sides of the expandable central portion 38. In the multi-root embodiment of the present invention the expandable central portion 38 and first and second peripheral portions 40, 42 are distinct portions of the inner form 26, but the first and second peripheral portions 40, 42 are in substantial communication with the expandable central portion 38. The first peripheral portion 40 of the inner form 26 comprises the first expandable anchor slot 80 for receiving the first core rail 110 and the second peripheral portion 42 of the inner form 26 comprises the second expandable anchor slot 82 for receiving the second core rail 112. The first expandable anchor slot 80 further comprises first and second expandable anchor locking ledges 98, 100 which correspond to and engage the core locking ledges 120, 122, which in the multi-root embodiment are disposed on the first rail 110. The coronal ends 30 of the first and second joined segments 66, 68 each further comprise a recess 34 and when the first and second joined segments 66, 68 are joined together the recesses 34 form the circumferential rim 36 to seat the core 24.

The coronal end 30 of the expandable anchor 22 has an asymmetrical outer 84 form to fit inside various multi-rooted tooth sockets, such as molars. The apical end 32 of the expandable anchor 22 bisects into the first and second root portion 148, 150. The outer surface of the expandable anchor 22 further comprises bone in-growth ridges 86 to facilitate better stability and osseointegration of the dental implant 12 with the surrounding bone in the tooth socket 14b. As shown, the bone in-growth ridges 86 comprise a plurality of circumferential ridges extending substantially perpendicular to the central axis A1. Alternative configurations may also be utilized; such as bone in-growth segments which are not completely circumferential or uniformly aligned. The outer surface of the expandable anchor 22 may also comprise one or more bone in-growth voids 162 for further stability and osseointegration.

The core 24 of the multi-root embodiment of the present invention comprises a coronal portion 56 and an apical portion 58. The coronal portion 56 comprises the dental prosthesis receptacle 60 by which a tooth abutment, healing cap or similar dental device or application may attach to the dental implant 12. The dental prosthesis receptacle 60 may comprise a tapered hollow 106 or, alternatively, a tapered protrusion. The base of the coronal portion 56 includes a flat or flattened loading surface 108, where the loading surface 108 is received by the circumferential rim 36 of the expendable anchor 20 when the core 24 is deployed into the expandable anchor 22. To improve the seating of the core 24 in the circumferential rim 36, the loading surface 108 may be dimensioned larger than the circumferential rim 36 to press-fit the core 24 with the expandable anchor 22.

In the multi-root embodiment of the present invention the first and second core rails 110, 112, along with an abutment 152 between the first and second core rails 110, 112, form the apical portion 58 of the core 24. The first and second core rails 110, 112 and abutment 152 extend apically from the base of the coronal portion 56. While the core 24 in this embodiment is defined as comprising a first and second core rail 110, 112, more than two rails is also contemplated as may be required depending on the size of the dental implant. Similar to the single-root embodiment described above, the first and second expandable anchor slots 80, 82 and first and second core rails 110, 112 may be symmetrical or asymmetrical. As shown in the figures, the present embodiment uses a first and second asymmetrical expandable anchor slot 80, 82 and a first and second asymmetrical core rail 110, 112 providing a single, proper alignment orientation for the expandable anchor 22 and the core 24. Symmetrical expandable anchor slots 80, 82 and core rails 110, 112 and may also be used, but would enable multiple alignment orientations for the expandable anchor 22 and the core 24. This arrangement requires attention to detail if the expandable anchor 22 and the core 24 are concentric or co-axial.

The first core rail 110 in the multi-root embodiment is also shown to terminate with a split 114 defining a first and second leg 116, 118. The first leg 116 includes the first core locking ledge 120 and the second leg 118 includes the second core locking ledge 122. As described above, the core locking ledges 120, 122 correspond to and engage the expandable anchor locking ledges 98, 100 in the first expandable anchor slot 80 receiving the first core rail 110. This arrangement is similar to a "split bayonet" connect. The abutment 152 is received in the expandable central portion 38 of the inner form 26 once the first and second joined segments 66, 68 expand.

In operation, the first and second legs 116, 118 compress about the split 114 as the first core 24 inserts into the expandable anchor 22. The first and second legs 116, 118 encounter the expandable anchor locking ledges 98, 100 at the lower arms 72 of the first joined segment 66. Tapered surfaces 154, 156 on the first and second legs 116, 118 pinch the legs together until the core locking ledges 120, 122 on the first and second legs 116, 118 slide over and past the expandable anchor locking ledges 98, 100. Once the core locking ledges 120, 122 pass over the corresponding expandable anchor locking ledges 98, 100, the first and second legs 116, 118 return to their initial, uncompressed positions, precluding the core locking ledges 120, 122 and expandable anchor locking ledges 98, 100 from disengaging.

The carrier 20 in the multi-root embodiment comprises a handle (not shown), shaft 126 and engagement end 62. The handle allows for use of the carrier 20 with a tool, such as a torque wrench, or by hand. The shaft 126 comprises a plurality of markers 64 indicating the amount of expansion of the expandable anchor 22 from the first, unexpanded position to the second, expanded position and corresponding to the size of the core 24 required. The engagement end 62 comprises a tapered tip 158 including a second helical thread 132 corresponding to the first helical thread 46 in the inner form 26 of the expandable anchor 22. The taper angle $\Theta_3$ of the tapered tip 158 corresponds with the taper angle $\Theta_1$ of the tapered hollow 106 in the inner form 26 where the first helical thread 46 is disposed. This arrangement provides for threaded engagement of the carrier 20 and the expandable anchor 22 and facilities and camming of the joined segments 66, 68 apart as the carrier 20 screws into the expandable anchor 22.

The expandable anchor 22 is assembled on the carrier 20 and delivered to the tooth socket 14b for insertion and expansion. The expandable anchor 22 is carefully positioned in the tooth socket 14b and when in a satisfactory position, the carrier 20 is rotated to generate the expansion force required to expand the expandable anchor 22 from the first, unexpanded position to the second, expanded position. The carrier 20 is rotated using a torque wrench or by hand to a predetermined force. Once the first and second joined segments 66, 68 have expanded to fit the tooth socket 14b, the plurality of markings 64 on the shaft 126 indicate the size of core 24 required to lock the first and second joined segments 66, 68 into position. Ideally, the plurality of markings 64 on the shaft and the sizes of the core will be color-coded. The core may be available in two or more sizes wherein the sizes vary in length and diameter. It is also contemplated the expandable anchor 22 may be positioned and expanded using, for example, expanding pliers instead of the carrier to apply the expansion force required to expand the first and second joined segments 66, 68 by a measured amount.

The multi-root embodiment of the inventive dental device 10 works such that:

1. The dental professional extracts the native tooth. Occasionally, some implant sites may require the removal of septum bone that may interfere with the placement of the dental implant 12.

2. The dental professional uses the trial replicas to determine the appropriate size of dental implant 12 to fit the tooth socket 14b.

3. Based on the chosen dental implant 12 size, the carrier 20 along with the expandable anchor 22, in its unexpanded configuration, is placed in the tooth socket 14b in the correct orientation. The carrier 20 is rotated (using a wrench or similar) to expand the joined segments 66, 68 of the expandable anchor 22 by a predetermined amount of rotational force. Once the predetermined force has been achieved, a colored code on the shaft 126 of the carrier 20 indicates the size of the core 24 the required for the final fitting of the dental implant 12. At this time, the size of the core 24 required is indicated by the radial markings on the carrier shaft in its current orientation. The marking closest to the buccal side of the tooth socket 14b indicates the correct core 24 size anticipated to provide the optimum expansion of the expandable anchor 22. The carrier 20 is unscrewed and disengaged from the expandable anchor 22, leaving the expandable anchor in the tooth socket 14b.

4. The chosen size of core 18 is placed in the tooth socket 14b within the space created by the expandable implant 20. The core 24 is deployed into the expandable anchor 22 in the correct orientation by matching the corresponding core rails 110 and corresponding expandable anchor slots 80, 82 in the expandable anchor 22. The rail-and-slot arrangement precludes the need to screw the core 24 into the expandable anchor 22.

5. Deployment of the core 24 into the expandable anchor 22 causes the legs 116, 118 of the first core rail 110 to compress along the split 114 and enables the core locking ledges 120, 122 to slide over and past the expandable anchor locking ledges 98, 100 of the expandable anchor 22. Once the core locking ledges 120, 122 are past the expandable anchor locking ledges 98, 110 of the expandable anchor 22 the legs 116, 118 return to their original, uncompressed position. Engagement of the core locking ledges 120, 122 and expandable anchor locking ledges 98, 100 lock the core 24 into the expandable implant 20.

6. The core rails 110, 112 keep the expandable anchor 22 close to the core 24 and at an optimum expanded position, without relying on socket pressure to hold the first and second joined segments 66, 68 of the expandable anchor 22 together.

7. The core locking ledges 120, 122 and the corresponding expandable anchor locking ledges 98, 100 prevent the apical end of the expandable implant 20 from collapsing inwards. Engagement of the core locking ledges 120, 122 and expandable anchor locking ledges 98, 100 also prevents the core 24 from falling out of the expandable anchor 22, and, eventually, out of the tooth socket 14b.

8. The insertion of the core 24 into the expandable anchor 22 exerts only vertical forces, when compared to the vertical and rotational forces applied if a core is screwed into position. This decreases the torque exerted by the dental implant on the tooth socket during installation. It also decreases the damage to tooth socket due to excessive torque and/or unwanted fixture rotation.

9. The loading surface 108 of the core 24, along with the non-rotatability of the core 24, increases the loading capacity of the dental implant 12; thereby resulting in a stronger implant.

10. The dental professional places a healing abutment at the coronal end of the core 24 in the dental prosthesis receptacle 60 and sutures the socket to approximate the surrounding tissues, on occasions, the dental professional may be able to place a crown abutment immediately.

11. The implant site is allowed to heal and the dental professional reviews the site on a regular basis. The dental professional places a permanent dental prosthesis once the implant site heals.

While the present invention has been described in connection with a specific application, this application is exemplary in nature and is not intended to be limiting on the possible applications of this invention. It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

I claim:

1. A dental device comprising: a dental implant for fitting into a tooth socket after extraction of a native tooth, the dental implant having a coronal end, an apical end, and a central axis extending through the coronal end and the apical end, the dental implant further comprising:

a. a dental prosthesis receptacle at the dental implant coronal end;
b. a core comprising a coronal portion and an apical portion, and a first leg having at its apical end a first core locking ledge;
c. an expandable anchor comprising a coronal end, an apical end, a first expandable anchor locking ledge corresponding to the first core locking ledge, and a plurality of joined segments, each including a coronal end and an apical end, the expandable anchor transformable from a first, unexpanded position to a second expanded position in response to an expansion force wherein the coronal end and apical end of each of the plurality of joined segments of the expandable anchor are displaced in parallel paths normal to the central axis in response to the expansion force, and
d. an inner form in the expandable anchor configured to receive the core and lock the plurality of joined segments in position when the expandable anchor is in the second, expanded position, wherein as the core is partially received into the expandable anchor, the first leg is compressed such that the first core locking ledge is slidable over the first expandable anchor locking ledge, and wherein when the core is fully received into the expandable anchor, the first leg uncompresses such that the first core locking ledge engages the first expandable anchor locking ledge.

2. The dental device of claim 1 further comprising a carrier including an engagement end configured to mate with the expandable anchor and wherein the carrier is apically displaced in the expandable anchor along the central axis to generate the expansion force.

3. The dental device of claim 2 wherein the inner form of the expandable anchor comprises a first helical thread and the engagement end of the carrier comprises a corresponding, second helical thread facilitating threaded engagement of the carrier and expandable anchor.

4. The dental device of claim 3 wherein the inner form of the expandable anchor comprises a tapered hollow and the first helical thread extends through at least a portion of the tapered hollow.

5. The dental device of claim 4 wherein the engagement end of the carrier comprises a taper angle corresponding to a taper angle of the tapered hollow of the inner form.

6. The dental device of claim 2 wherein the carrier comprises at least a first marker indicating an amount of expansion of the expandable anchor from the first, unexpanded position to the second, expanded position.

7. The dental device of claim 6 wherein the core is selected from a plurality of sizes to correspond to the amount of expansion of the expandable anchor as indicated by the carrier.

8. The dental device of claim 2 wherein the engagement end of the carrier comprises a circumferential ridge corresponding to a first locking ridge on an inner surface of a first of the plurality of joined segments and corresponding to a first locking ridge on an inner surface of a second of the plurality of joined segments.

9. The dental device of claim 1 wherein the coronal portion of the core comprises the dental prosthesis receptacle and the apical portion inserts into the expandable anchor.

10. The dental device of claim 1 wherein the core comprises a second core locking ledge corresponding to a second expandable anchor locking ledge and wherein engagement of the second core locking ledge and second expandable anchor locking ledge secures the core and anchor together.

11. The dental device of claim 1 further comprising at least one core rail received by a corresponding expandable anchor slot.

12. The dental device of claim 11 wherein the at least one core rail comprises a first core rail corresponding to and received by a first expandable anchor slot and a second core rail corresponding to and received by a second expandable anchor slot.

13. The dental device of claim 12 wherein the first and second core rails are asymmetrical.

14. The dental device of claim 12 wherein the inner form comprises a first and a second peripheral portion adjacent an expandable central portion and wherein the first expandable anchor slot is formed in the first peripheral portion and the second expandable anchor slot is formed in the second peripheral portion.

15. The dental device of claim 14 wherein engagement of the first and the second core rails with the corresponding first and second expandable anchor slots in the inner form align the core and expandable anchor.

16. The dental device of claim 15 wherein the first and the second core rails are asymmetrical, providing for a single, proper alignment orientation of the core and expandable anchor.

17. The dental device of claim 12 wherein the apical portion of the core comprises the first core rail and the core second rail.

18. The dental device of claim 17 wherein the apical portion of the core further comprises an abutment disposed between the first core rail and the second core rail.

19. The dental device of claim 18 wherein the inner form comprises an expandable center portion and the abutment is received in the expandable center portion.

20. The dental device of claim 12 wherein the first core rail comprises a split at the apical end, the split dividing the first rail into the first leg and a second leg, the second leg comprising a core locking ledge corresponding to and engaging a second expandable anchor locking ledge in the first expandable anchor slot to lock the first core rail into the expandable anchor first slot.

21. The dental device of claim 12 wherein the first and second expandable anchor slots are asymmetrical.

22. The dental device of claim 1 wherein an expandable central portion and a first and a second peripheral portion adjacent the expandable central portion comprise the inner form.

23. The dental device of claim 22 wherein the expandable central portion of the inner form comprises a tapered hollow.

24. The dental device of claim 1 wherein the core is selected from a plurality of sizes to correspond to an amount of expansion of the plurality of joined segments between the first, unexpanded position to the second, expanded position.

25. The dental device of claim 1 wherein the plurality of joined segments each comprise a first pair of arms, wherein a first arm of the first pair of arms of each of the plurality of joined segments slidably engages and overlaps a first arm of the first pair of arms of an adjacent joined segment.

26. The dental device of claim 1 wherein the coronal portion of the expandable anchor comprises an asymmetrical outer periphery.

27. The dental device of claim 1 wherein each of the plurality of the joined segments comprise a recess at the coronal end and the plurality of recesses align to form a circumferential rim in the expandable anchor to seat the coronal portion of the core.

28. The dental device of claim 1 wherein the dental prosthesis receptacle comprises a tapered hollow.

29. The dental device of claim 1 wherein the expandable anchor comprises a first and a second joined segment.

30. The dental device of claim 29 wherein the first joined segment comprises a first, upper pair of arms at the coronal end and a second, lower set of arms at the apical end, and the second joined segment comprises a first pair of arms wherein a first arm and a second arm of the pair of arms are received in a corresponding first and second space defined by the upper and lower pair of arms of the first joined segment.

31. The dental device of claim 29 wherein the first joined segment of the expandable anchor comprises a first expandable anchor slot at the apical end to receive a first core rail.

32. The dental device of claim 31 wherein the first core rail comprises a trapezoidal cross-section and the first expandable anchor slot comprises a corresponding configuration enabling dove-tail engagement of the first core rail and first expandable slot.

33. The dental device of claim 31 wherein the second joined segment of the expandable anchor comprises a second expandable anchor slot at the apical end to receive a second core rail.

34. The dental device of claim 33 wherein the second core rail comprises a trapezoidal cross-section and the second slot comprises a corresponding configuration enabling dove-tail engagement of the second core rail and second expandable anchor slot.

35. The dental device of claim 1 wherein the dental prosthesis receptacle is separated from the inner form of the expandable anchor, precluding communication between the dental prosthesis receptacle and the inner form of the expandable anchor.

36. The dental device of claim 1 the outer circumference of the expandable anchor comprises at least a first bone in-growth ridge.

37. The dental device of claim 1 wherein core further comprises a loading surface in communication with the expandable anchor.

38. The dental implant of claim 1 wherein the apical end of the apical portion of the core terminates at a first split dividing the apical portion into the first leg and a second leg.

39. The dental device of claim 38 wherein the second leg comprises a second locking ledge corresponding to and engaging a second expandable anchor locking ledge at the apical end of the expandable anchor and to lock the core and expandable anchor together in the inner form of the expandable anchor.

40. The dental device of claim 1 wherein the apical end of the expandable anchor comprises a first root portion corresponding to a tooth socket of a native tooth including a single root.

41. The dental device of claim 1 wherein the apical end of the expandable anchor comprises a first and second root portion corresponding to a tooth socket of a native tooth including at least a first root.

42. A dental device comprising: a dental implant for fitting into a tooth socket after extraction of a native tooth, the dental implant having a coronal end, an apical end, and a central axis extending through the coronal end and the apical end, the dental implant further comprising:
   a. a dental prosthesis receptacle at the dental implant coronal end;
   b. a core comprising a coronal portion and an apical portion, and a first leg having at its apical end a first core locking ledge;
   c. an expandable anchor comprising a coronal end, an apical end, a first expandable anchor locking ledge corresponding to the first core locking ledge, and a plurality of joined segments, each including a coronal end and an apical end, the expandable anchor transformable from a first, unexpanded position to a second expanded position in response to an expansion force wherein the coronal end and apical end of each of the plurality of joined segments of the expandable anchor are displaced in parallel paths normal to the central axis in response to the expansion force;
   d. an inner form in the expandable anchor configured to receive the core and lock the plurality of joined segments in position when the expandable anchor is in the second, expanded position, wherein as the core is partially received into the expandable anchor, the first leg is compressed such that the first core locking ledge is slidable over the first expandable anchor locking ledge, and wherein when the core is fully received into the expandable anchor, the first leg uncompresses such that the first core locking ledge engages the first expandable anchor locking ledge; and
   e. at least one core rail received by a corresponding expandable anchor slot.

43. The dental device of claim 42 further comprising a second core locking ledge corresponding to and engaging a second expandable anchor locking ledge, and wherein the at least one core rail comprises a first core rail corresponding to and received by a first expandable anchor slot and a second core rail corresponding to and received by a second expandable anchor slot.

* * * * *